(12) United States Patent
Azher et al.

(10) Patent No.: US 12,714,073 B1
(45) Date of Patent: Aug. 25, 2026

(54) METHOD FOR MONITORING AND INTERPRETING BIOMETRIC DATA FOR COWS

(71) Applicant: Nexa Labs Inc., Great Falls, VA (US)

(72) Inventors: Zarif Azher, San Francisco, CA (US); Alvin Zhang, San Francisco, CA (US); Kenneth Chan, San Francisco, CA (US); Kyle Berkson, San Francisco, CA (US)

(73) Assignee: Nexa Labs Inc., Great Falls, VA (US)

( * ) Notice: Subject to any disclaimer, the term of this patent is extended or adjusted under 35 U.S.C. 154(b) by 0 days.

(21) Appl. No.: 19/396,898

(22) Filed: Nov. 21, 2025

Related U.S. Application Data

(63) Continuation-in-part of application No. 19/331,418, filed on Sep. 17, 2025.

(60) Provisional application No. 63/860,299, filed on Aug. 8, 2025, provisional application No. 63/860,264, filed on Aug. 8, 2025, provisional application No. 63/783,647, filed on Apr. 4, 2025.

(51) Int. Cl.
*A01K 29/00* (2006.01)

(52) U.S. Cl.
CPC .......... *A01K 29/005* (2013.01); *A01K 29/004* (2025.08)

(58) Field of Classification Search
CPC ............................ A01K 29/005; A01K 29/004
See application file for complete search history.

(56) References Cited

U.S. PATENT DOCUMENTS

| | | | | |
|---|---|---|---|---|
| 7,764,181 | B2 * | 7/2010 | Stewart | G06K 7/10178 340/572.1 |
| 8,203,429 | B2 * | 6/2012 | Borcherding | G06K 7/0008 340/10.3 |
| 9,226,481 | B1 * | 1/2016 | Paripati | G01G 17/08 |
| 9,894,884 | B2 * | 2/2018 | Hill | A01K 29/005 |
| 10,231,440 | B2 * | 3/2019 | Seltzer | A01K 29/005 |

* cited by examiner

*Primary Examiner* — Daryl C Pope
(74) *Attorney, Agent, or Firm* — Run8 Patent Group, LLC; Peter Miller; Madison Tyrcha

(57) ABSTRACT

One variation of a method includes: compiling a corpus of historical biometric data into a set of historical biometric data containers; at a subdermal sensor unit associated with a cow, capturing a set of biometric data and transmitting the set of biometric data to a superficial tag arranged proximal the subdermal sensor unit; at the superficial tag, transmitting the first set of biometric data to an access point accessible by a remote computer system; representing the set of biometric data in a biometric data container; based on proximity of the biometric data container to a cluster of historical biometric data containers, calculating a similarity score between the biometric data container and the cluster of historical biometric data containers; and, in response to the similarity score exceeding a threshold similarity score, mapping a state, associated with historical biometric data containers in the cluster of historical biometric data containers, to the cow.

20 Claims, 7 Drawing Sheets

METHOD FOR MONITORING AND INTERPRETING BIOMETRIC DATA FOR COWS

CROSS-REFERENCE TO RELATED APPLICATIONS

This application is a continuation-in-part of U.S. patent application Ser. No. 19/331,418, filed on 17 Sep. 2025, which claims the benefit of U.S. Provisional Application Nos. 63/860,264 filed on 8 Aug. 2025, 63/860,299 filed on 8 Aug. 2025, and 63/783,647 filed on 4 Apr. 2025, each of which is incorporated in its entirety by this reference.

TECHNICAL FIELD

This invention relates generally to the field of cow health management and, more specifically, to a new and useful method for monitoring and interpreting biometric data for cows in the field of cow health management.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
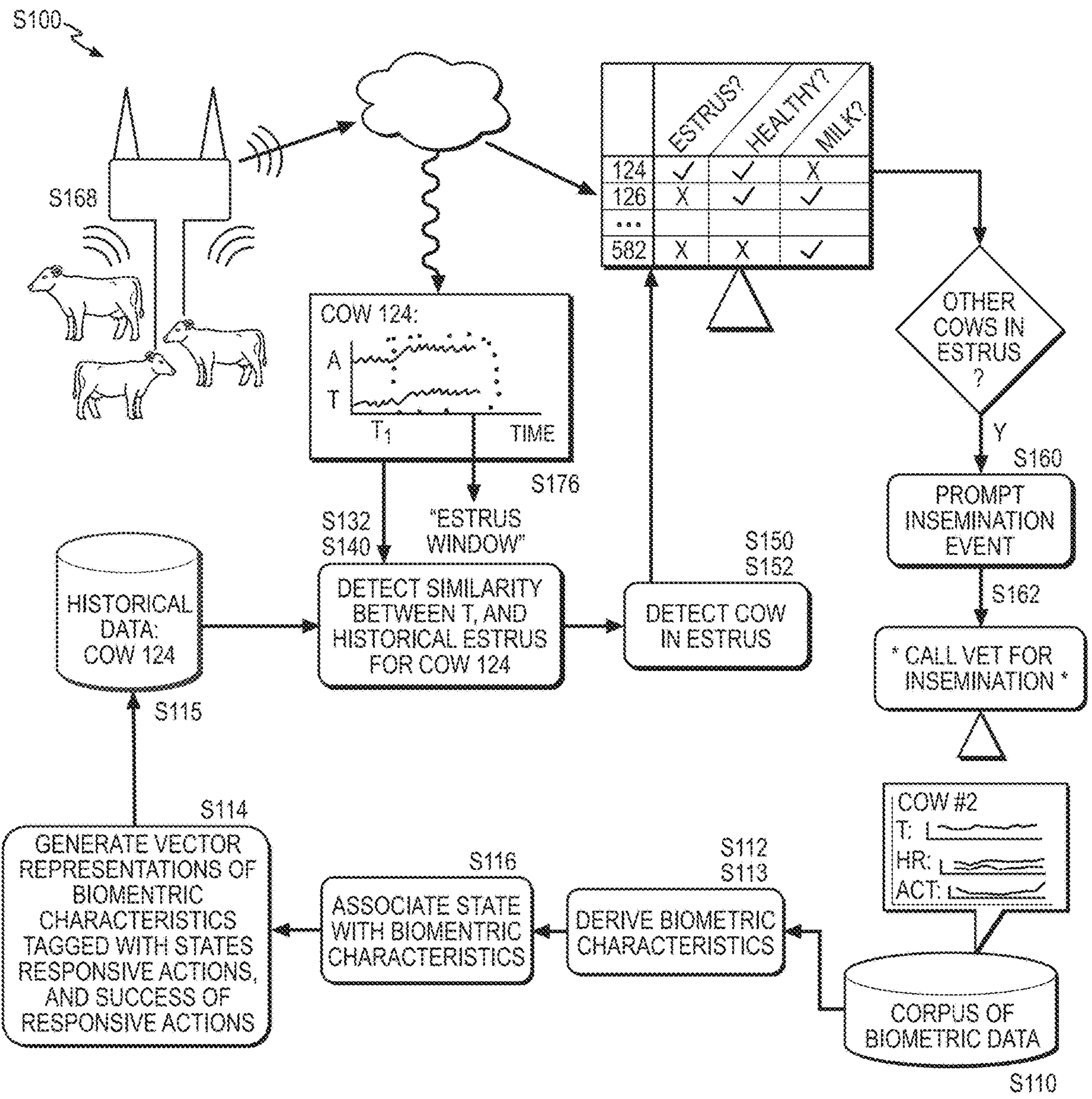
FIG. 1 is a flowchart representation of a method.
Figure 2:
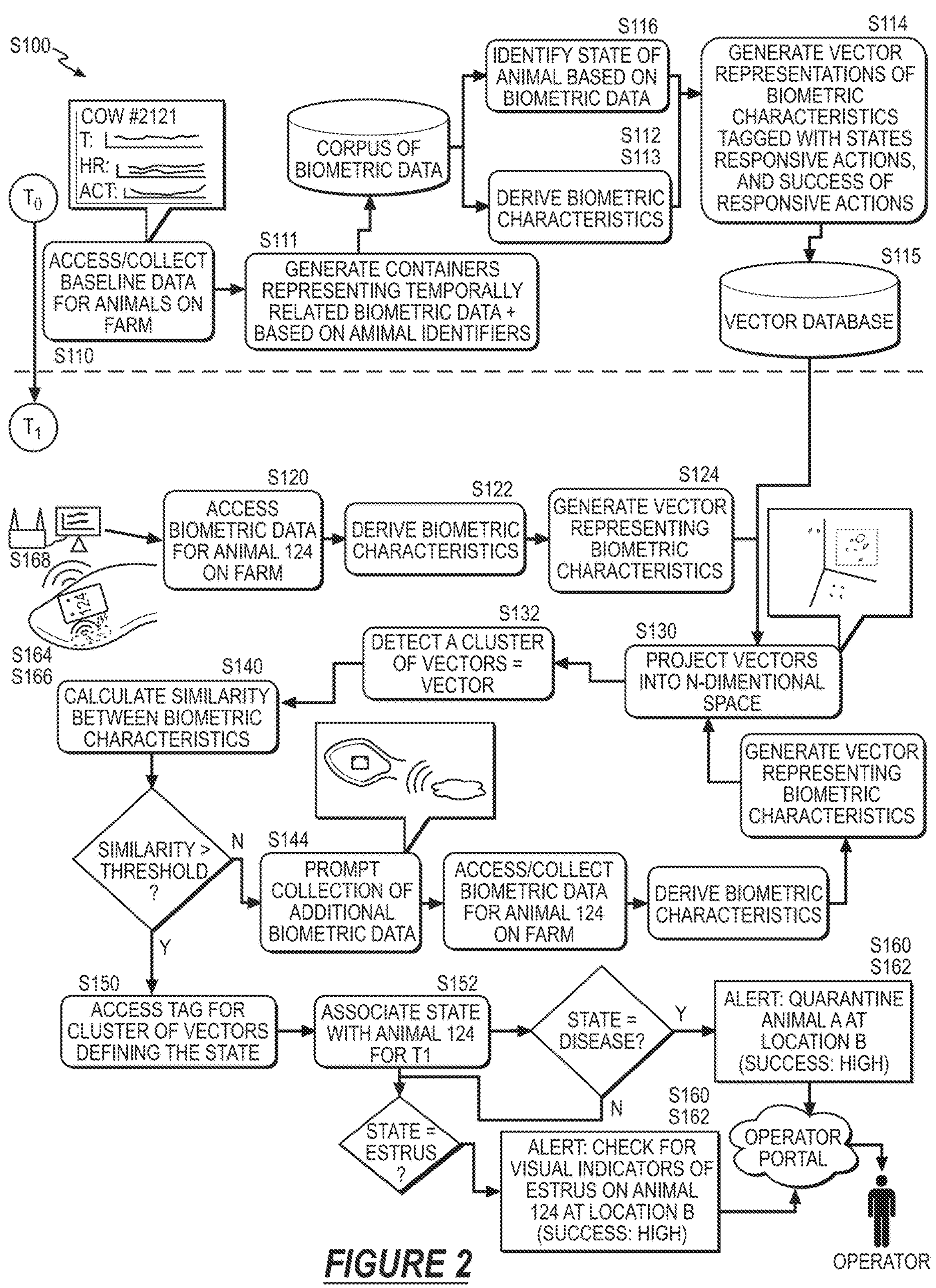
FIG. 2 is a flowchart representation of one variation of the method.
Figure 3:
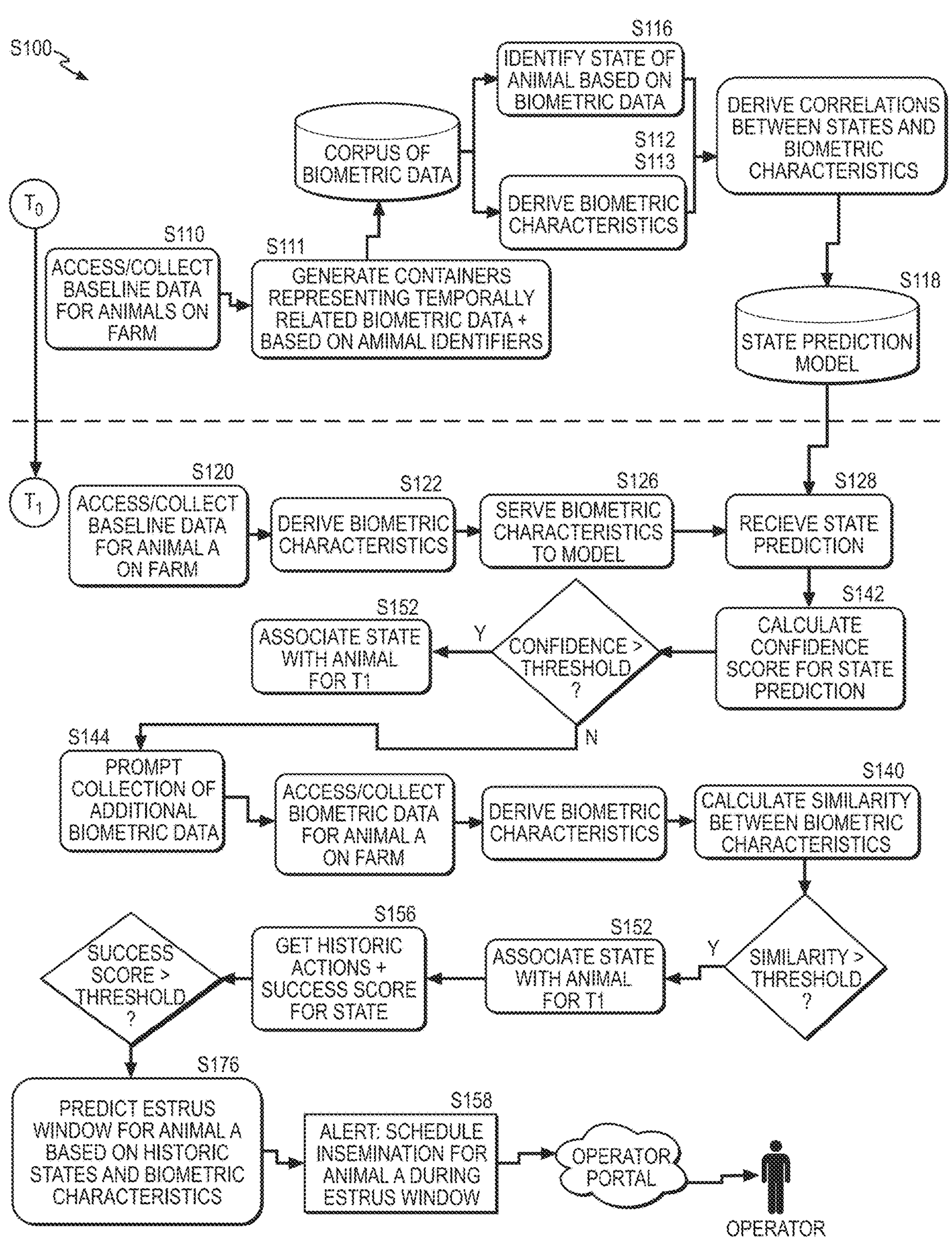
FIG. 3 is a flowchart representation of one variation of the method.
Figure 4:
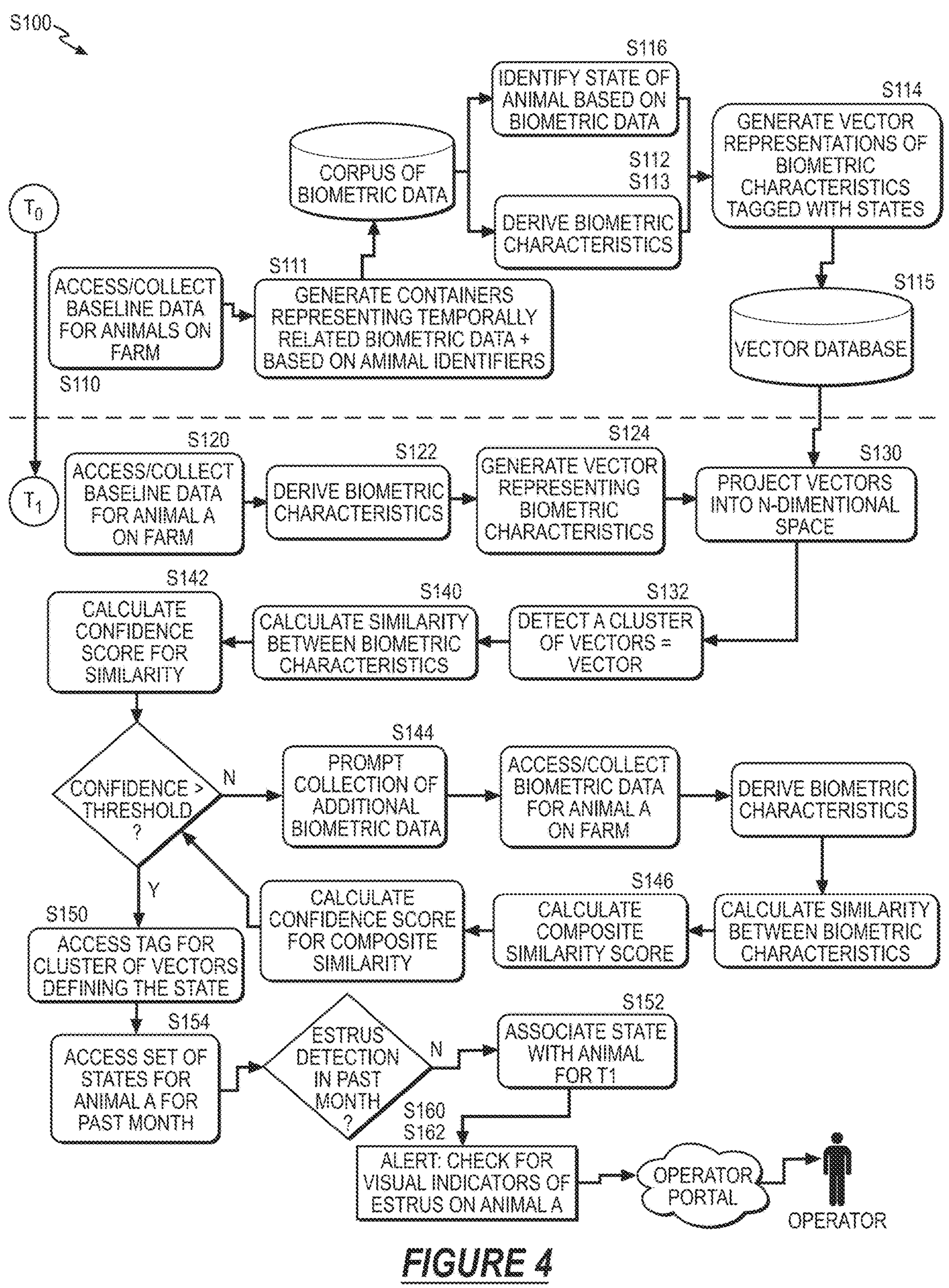
FIG. 4 is a flowchart representation of one variation of the method.
Figure 5:
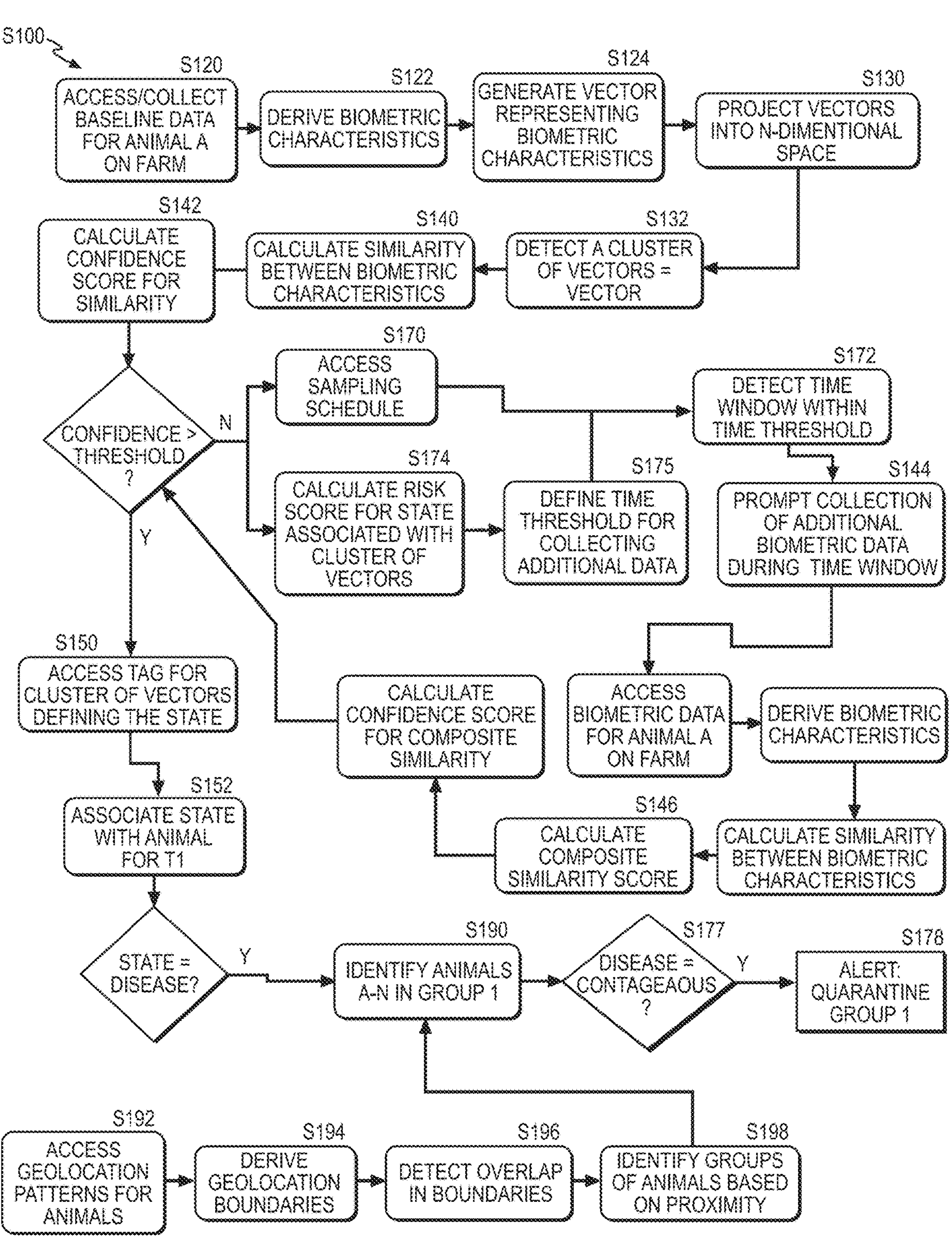
FIG. 5 is a flowchart representation of one variation of the method.
Figure 6:
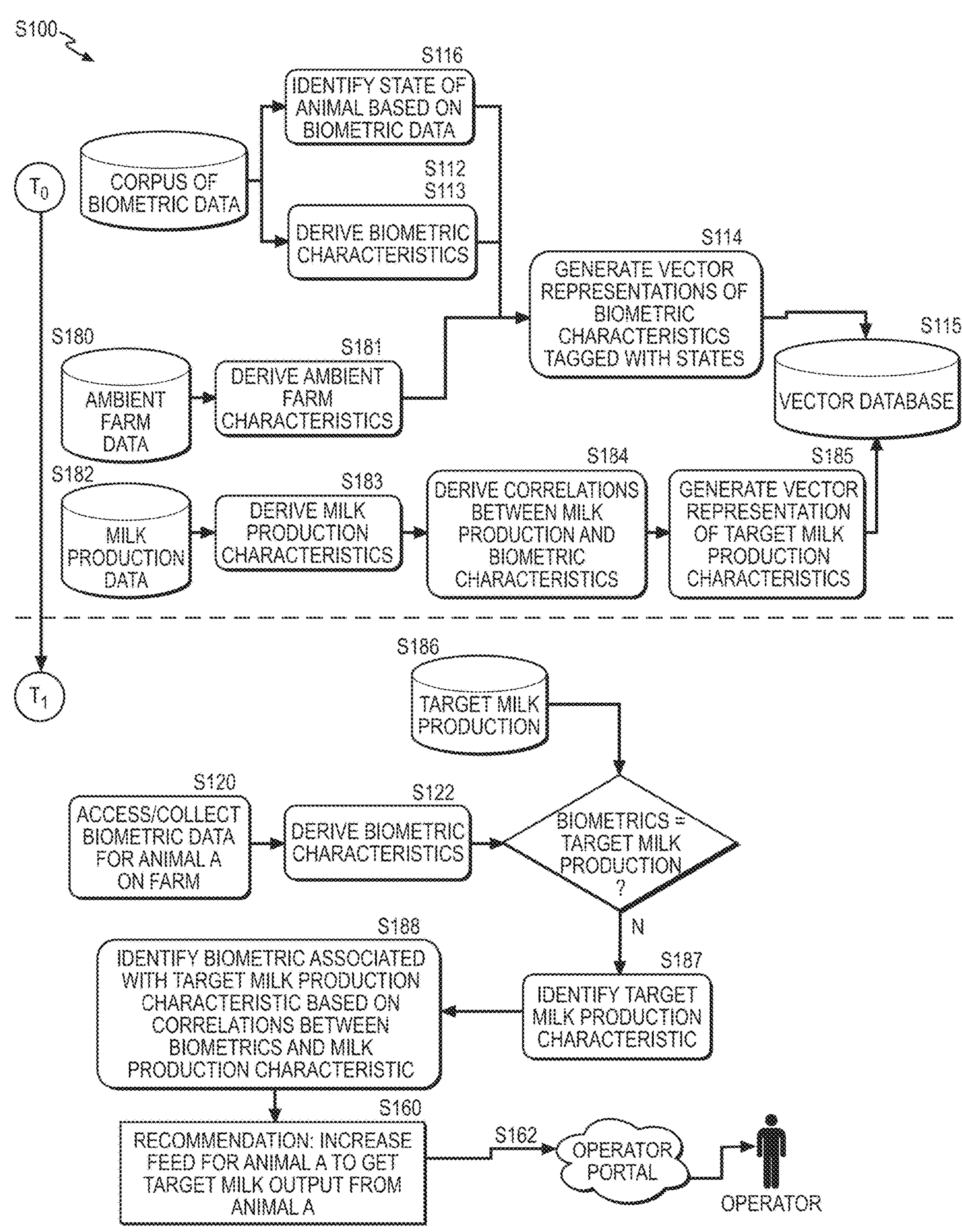
FIG. 6 is a flowchart representation of one variation of the method.
Figure 7:
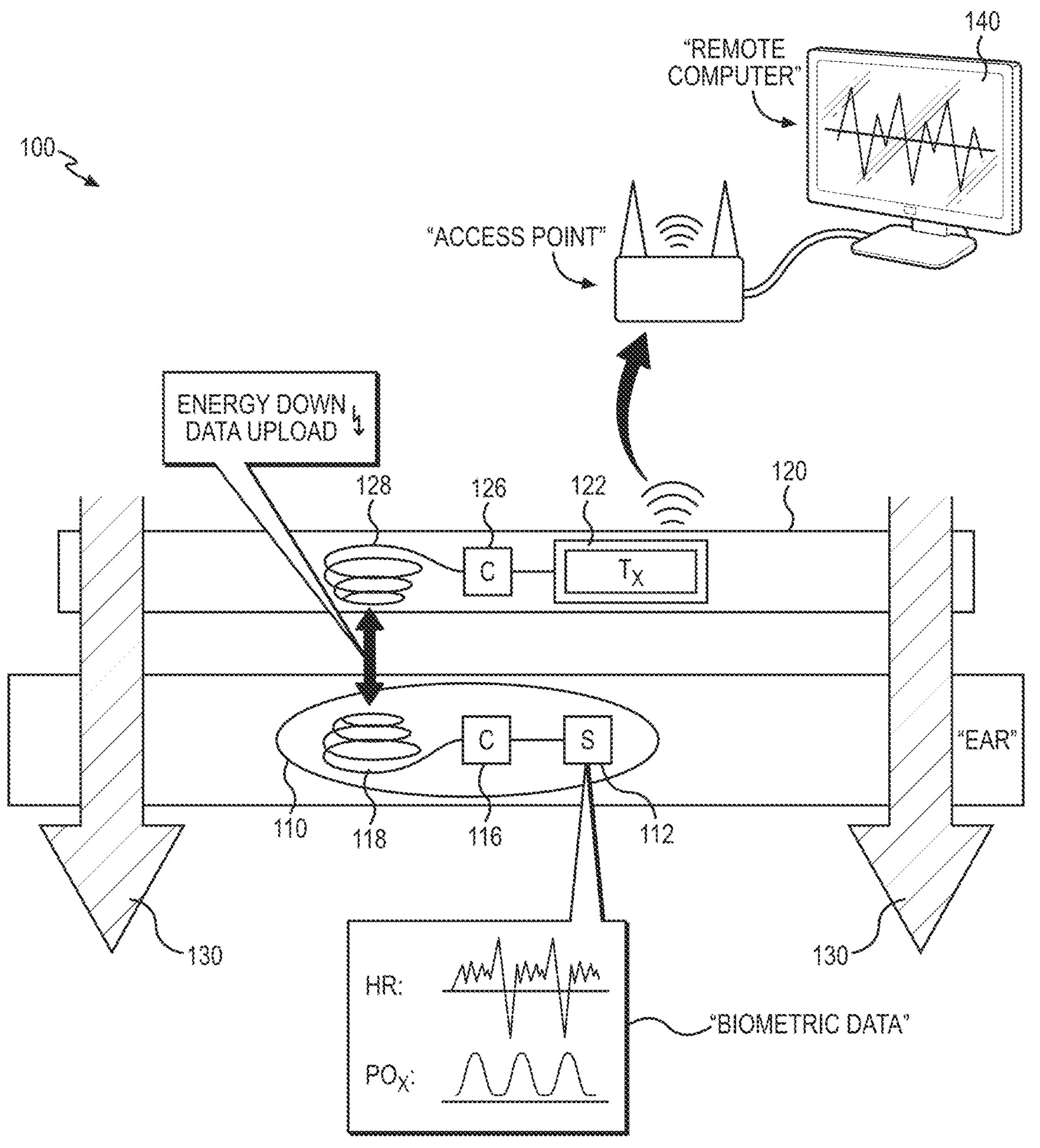
FIG. 7 is a schematic representation of a system.

As shown in FIGS. 1-5, a method S100 includes, during an initial time period: accessing a corpus of historical biometric data associated with a first cow in Block Silo; and compiling the corpus of historical biometric data into a set of historical biometric data containers, each historical biometric data container labeled with a state of a cow during collection of historical biometric data represented in the historical biometric data container in Block S111.

The method S100 also includes, during a second time period succeeding the initial time period and at a subdermal sensor unit associated with the first cow: capturing a first set of biometric data via a set of biometric sensors arranged within the subdermal sensor unit in Block S164; and transmitting the first set of biometric data, captured by the set of biometric sensors, to a superficial tag, arranged proximal the subdermal sensor unit, via a wireless charging coil arranged within the subdermal sensor unit in Block S166.

The method S100 further includes, at the superficial tag, transmitting the first set of biometric data to an access point accessible by a remote computer system in Block S168.

The method S100 also includes, during a second time period: representing the first set of biometric data in a first biometric data container in Block S124; based on proximity of the first biometric data container to a first cluster of historical biometric data containers, calculating a first similarity score between the first biometric data container and the first cluster of historical biometric data containers in Block S140; in response to the first similarity score exceeding a threshold similarity score, mapping a first state, associated with historical biometric data containers in the first cluster of historical biometric data containers, to the first cow in Block S152; generating a prompt to investigate the first cow, the prompt indicating the first state and the first cow in Block S160; and serving the prompt to an operator portal in Block S162.

1.1 Variation: Estrus Interval+Insemination Scheduling

One variation of the method S100 includes: mapping a state of estrus to the first cow in Block S152; accessing a set of records of insemination events of cows represented in the first cluster of historical biometric data containers in Block S156; accessing insemination results of historical insemination events represented in the set of records of insemination events in Block S156; identifying the first cow as available for successful insemination in response to detecting successful historical insemination results in the set of records of insemination events in Block S152; generating a prompt to schedule the insemination event for the first cow during the estrus window in response to identifying the first cow as available for successful insemination in Block S160; and serving the prompt to an operator portal in Block S162.

1.2 Variation: Contact Tracing

One variation of the method S100 includes: identifying a group of cows including the first cow in Block S190; accessing a series of geolocations associated with cows in the group of cows, the series of geolocations captured during the third time period in Block S192; detecting proximity of cows, in the group of cows, to the first cow based on the series of geolocations; generating a second prompt to quarantine the group of cows within the series of geolocations in Block S160; and serving the prompt to an operator portal in Block S162.

2. APPLICATIONS

Generally, the method S100 can be executed by a computer system: to receive biometric data captured by implanted devices in an animal (e.g., a domesticated bovid ungulate, "cow"); to collect and aggregate these biometric data over time; to derive health insights (e.g., states of the cow) based on these biometric data over time; to monitor estrus (e.g., reproductive health, "heat") and track health changes of the animal based on these biometric data and health insights; and to serve specific and actionable directives to a cattle rancher, farmer, farm hand, or veterinarian accordingly, thereby enabling the cattle rancher, etc. to deploy limited resources (e.g., farmer time, materials) effectively and when needed to directly support, maintain, and improve cattle health across a herd.

In particular, the computer system can execute Blocks of the method S100 to: receive biometric data, according to a sampling schedule, from each cow in the herd of cows; normalize these biometric data according to parameters derived from a population (e.g., thousands) of cows and parameters specific to each cow; compare these biometric data to historical states and/or characteristics of each cow; responsive to detecting an abnormal characteristic (e.g., increased activity, increased temperature), predict a state of a particular cow (e.g., estrus, disease) based on the abnormal characteristic; and prompt an operator (e.g., cattle rancher, farmer, farm hand, veterinarian) to take an appropriate action—such as proceeding with artificial insemination and/or quarantine of the cow—according to the predicted state of the cow.

Therefore, the computer system can interpret biometric data and prompt an appropriate responsive action more accurately to thereby enable more efficient and effective deployment of resources to cows that need attention, thereby improving health outcomes and yield (e.g., meat, milk, offspring) via lower total consumption of resources (e.g., veterinarian time, antibiotics, manual labor) across a herd of cows.

Additionally, by implementing parameters derived from a population (e.g., thousands) of cows in order to derive states of cows in the herd of cows, the computer system can enable rapid onboarding times (e.g., one day, one week) to thereby enable a cattle rancher to rapidly understand a population-wide state of the entire herd of cows.

2.1 Example: Data Representations+Embeddings

For example, the computer system can generate a database representing historical data for a population of cows such as by: accessing a corpus of biometric data, collected from a population of cows and/or data ingested from additional sources; deriving characteristics from these biometric data, such as nominal ranges of biometric data points (e.g., temperature range, heart rate range); generating representations (e.g., vectors, embeddings, data containers) representing these historical biometric characteristics; and reading tags, associated with each representation, specifying distinct states—such as particular diseases, estrus, milk production characteristics, meat production characteristics, etc.—of cows in the population of cows represented by the representation.

Then, the computer system can, for a particular cow: receive (and/or otherwise access) a set of biometric data captured during a target time period from a particular cow in the population of cows; generate a new representation, based on the set of biometric data, representing the cow for the target time period; detect proximity between the new representation and a particular cluster of representation; access a tag, representing a state (e.g., disease, estrus, milk production characteristics, meat production characteristics) associated with the particular cluster of representations; and predict the state for the cow for the target time period. The computer system can then derive a recommended action (e.g., quarantine, proceed with artificial insemination); and transmit the recommendation to an operator portal to thereby enable the operator (e.g., cattle rancher, farmer, farm hand, veterinarian) to take the recommended action.

In another example, the computer system can: derive baseline profiles for the population of cows; and detect deviations from these baseline profiles based on multiple data streams and/or modalities.

In one example, the computer system can: generate a baseline cow profile based on historic cow behavior—such as behavior exhibited by the cow and similar cows; monitor physiological biometrics for the cow according to real-time data streamed from an on-cow device; detect deviations from baseline behavior, such as spikes in physiological signals; corroborate these spikes with additional data streams to determine whether the cow is experiencing an atypical event (e.g., disease, heat); and flag the cow for investigation (e.g., quarantine, insemination) responsive to validation of these spikes.

In one example, during an onboarding period, the computer system can: access a first set of biometric data captured by a subdermal sensor unit within a first cow; identify a cow type (e.g., species, age, sex) of the first cow; access a composite cow profile associated with the cow type; and compile the composite cow profile and the first set of biometric data into a cow profile specific to the first cow. Then, during time periods following the onboarding period, the computer system can receive biometric data streams of biometric data captured by the subdermal sensor unit within the first cow. In particular, during a first time period, the computer system can: detect a first spike in temperature for the first cow according to a second set of biometric data associated with the first cow; and, in response to detecting the spike in temperature, scan additional sets of biometric data (e.g., rumination time, activity, heart rate variability) for deviations analogous to the spike in temperature. Accordingly, by detecting multiple indicators of particular states (e.g., disease symptoms, estrus indicators), the computer system can enable more accurate detection of these states.

Therefore, the computer system can derive (or predict) specific states of the cow during a target time period and, responsive to the state corresponding to a target state, transmit an actionable prompt to an operator to enable the operator to timely respond to the target state of the cow, such as quarantining the cow.

2.2 Example: Disease Detection+Actions

Generally, the computer system can implement methods and techniques as described herein to: monitor biometric data for cattle over time; based on individual (e.g., cow-specific) biomarkers (or indicators) and global (e.g., population, herd) biomarkers (or indicators), detect a particular cow is experiencing disease; and prompt a farm operator to quarantine the cow and/or take an action specific to the disease identified for the cow.

In particular, the computer system can: generate a historical biometric database, as described herein; detect tags of clusters of historical biometric representations indicating a particular disease; responsive to a first biometric representation defining a similarity to the cluster of historical biometric representations, associate the particular disease with the cow; and prompt an operator to quarantine this cow. In this example, responsive to detecting (or predicting) the particular disease for the cow, the computer system can: automatically detect a group of cows proximal the diseased cow during the target time period (e.g., cows within a target distance from the diseased cow, cows that interacted with the diseased cow during the target time period); implement methods and techniques as described herein for cows in the group of cows to particularly detect symptoms of the particular disease in these cows; and accordingly recommend quarantine of cows in the group of cows expressing symptoms of the particular disease.

Therefore, by automatically detecting diseased cows in a herd of cows, the computer system can enable a cattle rancher (or other farm operator) to earlier and appropriately quarantine these diseased cows—such as immediately upon disease detection—to decrease likelihood of disease spreading throughout the herd of cows, thereby reducing risk of morbidity, and even mortality, of cows in the herd of cows. Additionally, the computer system can detect and distinguish between specific diseases, enabling the farm operator to administer specific antibiotics (or other medicines) to these diseased cows, rather than administering large amounts of medicine to a larger count of cows, to thereby reduce overall resource consumption associated with cow morbidity.

2.3 Example: Estrus Detection+Actions

Generally, the computer system can implement methods and techniques as described herein to: monitor biometric data for cattle over time; based on individual biomarkers (or indicators), detect a particular cow is in estrus; and prompt a farm operator to confirm other physical indicators of estrus.

For example, the computer system can: generate a historical biometric database as described herein; detect tags of clusters of historical biometric representations indicating estrus; responsive to a first biometric representation defining a similarity to the cluster of historical biometric representations, predict the cow is in estrus; and prompt an operator to investigate this cow to confirm estrus and, if estrus is confirmed, proceed with artificial insemination.

In particular, the computer system can: associate historical instances of estrus with particular historical characteristics of the cow (e.g., a cluster of historical biometric vectors representing historical states); access biometric data captured from a cow during a target time period, such as heart rate, temperature, etc.; generate a biometric representation representing biometric data for the cow during the target time period; responsive to a first biometric representation defining a similarity to the cluster of historical biometric representations, predict the cow is in estrus; and prompt an operator to investigate this cow to confirm estrus and, if estrus is confirmed, proceed with artificial insemination.

In one implementation, the computer system can detect a stage of the estrus cycle and/or predict a target insemination time period (i.e. an estrus time window) for the cow. For example, the computer system can implement methods and techniques as described herein for a particular cow to detect characteristics of each stage of the estrus cycle for this specific cow. The computer system can then monitor biometric data of this cow over time and predict a stage of estrus accordingly. In particular, responsive to detecting that the cow is in stage two of estrus, the computer system can issue an alert and prompt a farm operator to investigate the cow during the target insemination time period.

In another implementation, the computer system can weight other environmental or contextual factors to determine a stage and/or presence of estrus for the cow. For example, the computer system can implement methods and techniques as described herein to predict a cow is in estrus; and access a recent history (e.g., a past month) for the cow, such as biometric data and/or health reports. If the computer system identifies a mismatch between predicted estrus and the cow's apparent estrus cycle (e.g., based on historical estrus states, derived estrus cycle based on historical estrus states, herd management records), the computer system can discard identification of estrus for this cow—and attribute these symptoms to potential disease.

In another variation, the computer system can implement methods and techniques as described herein to predict successful insemination and/or successful pregnancy for the cow. For example, the computer system can: monitor biometric data for the cow over time; detect absence of a state of estrus for the cow during a target time period (e.g., one month); and, based on absence of the state of estrus for the cow, predict a successful pregnancy of the cow.

Therefore, the computer system can enable the cattle rancher, farmer, farm hand, and/or veterinarian to more easily detect instances of a cow in estrus, thereby: reducing redundant vet visits to confirm if the cow is in estrus, by increasing confidence in estrus detection; and reducing waste of discarding insemination products by proceeding with artificial insemination when a cow is not in estrus and/or is experiencing other biometric conditions outside of a target biometric range.

Additionally, by constantly monitoring cow health, the computer system can thereby monitor health of a pregnant cow and alert a farm operator as soon as disease and/or other threshold biomarkers are detected, to thereby enable the farm operator to deploy appropriate resources and reduce likelihood of embryo loss for the pregnant cow, thereby increasing total cow yield.

2.4 Example: Milk Production

In another example, the computer system can implement methods and techniques as described herein to: detect correlations between historic biometric data and milk production outputs (e.g., milk fat percentage); monitor biometric characteristics of cows, in a herd of cows, over time; and predict milk production characteristics (e.g., yield, quality) for a target time period based on these biometric data.

In this example, while the computer system is generating the historical biometric database, the computer system can additionally: access milk production data, associated with a cow in the population of cows, for a first time period; derive milk production characteristics (e.g., yield, fat content, protein content, somatic cell count) based on these historical milk production data; and correlate these biometric data with these milk production characteristics. The computer system can repeat this method for each cow in a herd of cows to therefore derive a corpus of representations representing correlations between biometric data and milk production characteristics for each cow in the herd of cows.

Accordingly, the computer system can, during a second time period succeeding the first time period: implement methods and techniques as described herein to access biometric data for the cow during the second time period; and detect similarity between these biometric data and historical milk production characteristics.

Additionally, in this implementation, the computer system can: access target milk production characteristics for the cow; and detect target biometric data correlated with the target milk production characteristics. Then, responsive to detecting deviation from the target biometric data, the computer system can prompt a farm operator to adjust environmental parameters (e.g., feed quality, feed quantity, location of the cow, housing, cow group membership) to thereby drive these biometric data toward the target biometric data.

Accordingly, by deriving correlations between biometric data and milk output, the computer system can: predict milk output characteristics for target time periods, such as when prompted by a farm operator; detect instances of deviation from target biometric data for a target milk output (e.g., target yield, target milk fat percentage). Therefore, the computer system can prompt the farm operator to take specific actions correlated with these deviations from target biometric data to thereby drive milk output toward target milk output characteristics, thereby increasing total yield for the farm due to this target milk output.

2.5 Variation: Additional Data Collection

In one implementation, in response to calculating low confidence for a particular state of a particular cow, the computer system can transmit a request for additional data to a superficial tag, wirelessly connected to a subdermal sensor unit implanted in the cow.

For example, the computer system can: implement methods and techniques as described herein to calculate a similarity score between a first biometric representation and a cluster of biometric representations representing a particular state. The computer system can additionally calculate a confidence score for the similarity score, such as based on resolution of the biometric data, a sampling period for the biometric data, and/or a magnitude of deviation from a baseline state of the cow, etc.

In particular, the computer system can: detect the confidence score falling below a threshold confidence score; and transmit a request for additional biometric data from a subdermal sensor unit (e.g., via a superficial tag wirelessly connected to the subdermal sensor unit).

Therefore, the computer system can: immediately access this new biometric data; incorporate the new biometric data into the biometric representation; calculate a new similarity between the biometric representation and the cluster of biometric representations; calculate a new confidence score for the new similarity score, the new confidence score exceeding the (previous) confidence score; and, in response to the new confidence score exceeding the threshold confidence score, generate the prompt for the farm operator.

Additionally or alternatively, in this implementation, the computer system can: access a sampling schedule for the cow; detect a next sampling window for the cow; and, in response to the next sampling window falling within a threshold temporal offset from a current time, withhold requesting additional data and wait for new biometric data collected during the next sampling window. In particular, the computer system can: predict a first state for the cow during the target time period; calculate a risk score for the first state; calculate a confidence score for prediction of the first state; and, in response to the risk score exceeding a threshold risk score and in response to the confidence score falling below a threshold confidence score, transmit a request for additional biometric data from a subdermal sensor unit (e.g., via a superficial tag wirelessly connected to the subdermal sensor unit).

Additionally or alternatively, in response to the risk score falling below the threshold risk score and in response to the confidence score falling below the threshold confidence score, the computer system can withhold requesting additional data and wait for new biometric data collected during the next sampling window.

Therefore, the computer system can opportunistically access additional data to more accurately—and with higher confidence—predict states of the cow based on biometric data of the cow.

2.6 Example: On-Farm Actions

In one variation, the computer system can transmit states of cows, in a herd of cows maintained on a particular farm, to on-farm devices or machines (e.g., herd management systems, sorting gates, feeding devices, milking devices, milk meters, camera systems, environmental sensors) automatically implement responsive actions to states of these cows in the herd of cows. For example, in response to detecting a particular cow is in estrus, the computer system can: monitor a geolocation of the particular cow; and trigger (e.g., via sending a request) to a sorting gate proximal the particular cow to drive (or "corral") the particular cow to an insemination location (e.g., an insemination pen).

Therefore, the computer system can transform detection of states of cows within the herd into coordinated mechanical actions across on-farm equipment, thereby enabling automated execution of state-dependent interventions to thereby: reduce deployment of labor-associated operational resources for the farm operator; and mitigate operational and reproductive impact of missed or delayed biological events.

The method S100 is described herein as executed by a computer system (e.g., a remote computer system, a remote server, a computer network). However, Blocks of the method S100 can be executed by one or more local computing devices within or connected to a computer network, by a local computer, or by any other computer system.

3. SYSTEM

Generally, the computer system can access biometric data collected by a subdermal sensor unit, installed in a cow (e.g., in an ear of a cow), and transmitted to an access point by a superficial tag, wirelessly connected to the subdermal sensor unit.

In particular, a system for collecting and transmitting biometric data can include a subdermal sensor unit and a superficial tag that cooperate to: collect subdermal biometric data—such as heart rate, breathing rate, dissolved blood oxygen, blood pressure, and subdermal temperature—from a cow over time (e.g., over one-minute intervals every hour of every day for one year); and to wirelessly transmit these subdermal biometric data to an access point. The computer system (e.g., a computer network, a computer server) can then: collect and aggregate these subdermal biometric data over time; monitor estrus (e.g., reproductive health, "heat") and track health changes of the cow based on these subdermal biometric data; and serve specific and actionable directives to a cattle rancher, farmer, farm hand, or veterinarian accordingly, thereby enabling the cattle rancher, etc. to deploy limited resources effectively and when needed to directly support, maintain, and improve cattle health across a herd.

In particular, the subdermal sensor unit, injectable under skin of an cow, can include: a subdermal housing; a biometric sensor configured to capture biometric data from under skin of the cow; and a subdermal short-range wireless transmitter configured to broadcast this biometric data across a short transmission range (e.g., less than one inch) according to a short-range wireless communication protocol. The superficial tag, located within the short transmission range of the subdermal short-range wireless transmitter, can include a wireless communication module configured to: intercept this biometric data broadcast by the subdermal short-range wireless transmitter of the subdermal sensor unit; and transmit (or broadcast) this biometric data to a remote access point across a longer transmission range (e.g., up to one mile) according to a longer-range wireless communication protocol.

More specifically, a subdermal sensor unit is injectable under skin of an ear of an cow, and a superficial tag can install (e.g., via a set of barbs) on the ear of the cow directly over the subdermal sensor unit such that: a short-range wireless receiver in the wireless communication module of the superficial tag is located directly over the subdermal short-range wireless transmitter, thereby minimizing distance between the tag receiver and subdermal transmitter, reducing transmit distance from the subdermal transmitter to the tag receiver; and reducing power consumption to transmit data from the subdermal transmitter to the tag receiver. In particular, minimizing a distance between the superficial tag receiver and the subdermal transmitter reduces path loss, to thereby enable the subdermal short-range wireless transmitter to define a lower transmit power for transmissions to the wireless receiver in the wireless communication module.

In one implementation, the subdermal sensor unit can receive (all) power from the superficial tag via wireless charging. Because wireless charging can be inefficient (e.g., 60-75% efficient), the subdermal short-range wireless transmitter defining the lower transmit power enables the superficial tag to store a lower amount of energy (e.g., 1.4 times less), to thereby enable the superficial tag to include a (smaller) battery (and/or operate over a longer period of time, more efficiently).

In particular, the subdermal sensor unit: captures biometric data; annotates these biometric data with a unique identifier of the subdermal sensor unit; transmits these biometric data, annotated with the unique identifier to the superficial tag (e.g., the superficial receiver within the wireless communication module of the superficial tag) over short-range, low-power wireless communication protocol, such as via a discrete short-range transmission antenna (e.g., NFC) in the subdermal sensor unit or via load modulation via the inductive charging coil while receiving an inductive charging signal from the superficial tag. The superficial tag: receives these data from the subdermal sensor unit; and passes these data to a remote access point, such as over longer-range, low-power wireless communication protocol via a discrete longer-range, higher-power transmission antenna without initiation by an interrogation signal.

Accordingly, by automatically collecting biometric data from the cow and passing these data from the subdermal sensor unit to the superficial tag to the remote computer system, the system can: automatically monitor health statuses of individual cows without need to corral the cows or otherwise manually handle the cows; collect more accurate and authentic biometric data that represent normal resting and normal activity of a cow, such as without additional bovine stress due to manual handling; and collect biometric data more consistently and at a higher frequency, such as one minute of every hour of every day.

Therefore, the system can enable more accurate and complete representation of biometric data in an individual cow over time, and thus changes in these biometric data may more accurately predict or indicate changes in health status of an individual cow.

In particular, the system can detect, interpret, and prompt action more accurately to thereby enable more efficient and effective deployment of resources to cows that need attention, thereby improving health outcomes and yield (e.g., meat, milk, offspring) via lower total consumption of resources (e.g., veterinarian time, antibiotics, manual labor) across a herd of cows.

For example, the system can enable biometric data collection, transmission, and/or interpretation for a set (or herd) of cows while these cows are ranging over a space (e.g., territory, pasture, field) without corralling the set of cows into a local area (e.g., paddock) and without manually extracting these data (e.g., via an interrogation signal) from the subdermal sensor unit and/or the superficial tag.

3.1 Subdermal Wireless Charging and Decoupled Data Transmission

In one implementation, the subdermal sensor unit includes: a local energy store (e.g., battery, capacitor) sized to power the subdermal sensor unit for a brief time period (e.g., up to ten minutes); an inductive charging coil; and a short-range transmission antenna distinct from the inductive charging coil.

In this implementation, the superficial tag includes: a battery (e.g., a coin cell battery) configured to store sufficient energy to power the subdermal sensor unit and superficial tag for a longer time period (e.g., six months, two years); an inductive charging cell configured to locate over the inductive charging coil in the subdermal sensor unit when the superficial tag is installed on an ear over the subdermal sensor unit located under the skin of the ear; and a short-range receiving antenna distinct from the inductive charging cell.

In this implementation, the superficial tag can send power to the subdermal sensor unit. In particular, the subdermal sensor unit can include an inductive charging coil configured to charge a local energy store (e.g., a battery) with power received from the superficial tag. In particular, once the local energy store of the subdermal sensor unit reaches a sufficient voltage, the subdermal sensor unit can enter an active state, capture biometric data, and transmit these biometric data to the superficial tag via the subdermal short-range receiving antenna.

Accordingly, the subdermal sensor unit can characterize a low-power profile such that a power provided by the superficial tag approximates a power threshold, defined by power required to activate and capture data by the biometric sensor and power required to broadcast data packets, including these data captured by the biometric sensor and a unique identifier associated with the subdermal sensor unit, across a broadcast range defined by the short-range wireless communication protocol.

3.2 Subdermal Wireless Charging and Decoupled Data Transmission Via Load Modulation Alternatively, the subdermal sensor unit can exclude a short-range transmission antenna and the superficial tag can exclude a short-range receiving antenna. In this variation, the subdermal sensor unit can: at a first time, store a first set of biometric data, collected during a first biometric data collection cycle, within a local memory of the subdermal sensor unit; at a second time succeeding the first time, receive power from the superficial tag (e.g., via the inductive charging coil) to power a second biometric data collection cycle; and, at the second time, transmit (or otherwise broadcast) the first set of biometric data (and/or any biometric data stored in the local memory, i.e., from last data collection period) to the superficial tag via load modulation.

3.3 Subdermal Wireless Charging and Coupled Data Transmission Via Load Modulation Alternatively, the subdermal sensor unit can exclude a short-range transmission antenna and a local energy store, and the superficial tag can exclude a short-range receiving antenna. Accordingly, the superficial tag can transmit power to the subdermal sensor unit in real time to prompt the subdermal sensor unit to sample biometric data and stream these biometric data to the superficial tag via an inductive charging coil.

In particular, the subdermal sensor unit can: transmit the unique identifier to the superficial tag via load modulation; capture a set of biometric data; and stream the set of biometric data to the superficial tag via load modulation.

Accordingly, in this variation, the subdermal sensor unit can stream biometric data to the superficial tag without data latency between data capture and data streaming (or transmitting). Additionally, the subdermal sensor unit can define a low-energy profile by capturing only biometric data while the superficial tag is providing power to the subdermal sensor unit.

3.4 Installation

In particular, the subdermal sensor unit and the superficial tag can wirelessly communicate—via the subdermal short-range wireless transmitter and the tag wireless communication module—based on proximity between the subdermal sensor unit and superficial tag.

Because the subdermal short-range wireless transmitter can be configured to broadcast data at a first power (e.g., nine mW, three mW) according to a short-range wireless communication protocol (e.g., near-field communications), the system can enable passive offload of data from the subdermal sensor unit without initiation by an interreference signal (e.g., radio frequency identification). Additionally, because the tag wireless communication module can be configured to broadcast data at a second power (e.g., 20 mW) according to a longer-range wireless communication protocol, the system can enable passing offload of data from the superficial tag without initiation by an interreference signal (e.g., radio frequency identification).

Additionally, the tag wireless communication module can intercept data broadcast by the subdermal short-range wireless transmitter based on proximity between the subdermal sensor unit and the superficial tag. In particular, the superficial tag can include a set of barbs configured to pass through an ear of the cow to retain the tag housing on the ear of the cow and maintain proximity between the subdermal short-range wireless transmitter and the tag wireless communication module. In particular, during installation of the system on an cow, a user may: inject the subdermal sensor unit under skin of an ear of an cow to install the subdermal sensor unit subdermally within the ear of the cow; and pass the set of barbs through the ear of the cow proximal an injection site of the subdermal sensor unit such that the set of barbs axially straddle the subdermal sensor unit to prevent migration of the subdermal sensor unit within skin (or the ear) of the cow.

Accordingly, the set of barbs can retain a position of the superficial tag on the ear of the cow—proximal the injection site of the subdermal sensor unit—to thereby maintain wireless communication between the subdermal short-range wireless transmitter and the tag wireless communication module according to the short-range wireless communication protocol defined by the subdermal sensor unit.

Therefore, the subdermal transmitter and the superficial receiver (and/or the inductive charging coil and the inductive charging cell) can be installed within a particular distance relative to each other to: improve energy efficiency; reduce a size of the subdermal sensor unit and/or the superficial tag; improve cow comfort while the superficial tag and subdermal sensor unit are installed within and upon the cow; and inherently secure data transmission between the subdermal sensor unit and the superficial tag.

The system is described herein as including a set of barbs configured to pass through an ear of the cow to retain the tag housing on the ear of the cow and maintain proximity between the subdermal short-range wireless transmitter and the tag wireless communication module. However, the superficial tag can include any other retention forms, such as a spring element configured to bias a tag housing toward the ear of the cow, a single barb configured to partially pass through skin of the cow, etc.

3.5 Data Collection Triggers

In one implementation the superficial tag can: access a sampling schedule; and, according to the sampling schedule, transmit power to the subdermal sensor unit to trigger the subdermal sensor unit to collect a set of biometric data. The subdermal sensor unit can then: receive power from the superficial tag to recharge an internal energy storage of the subdermal sensor unit; collect the set of biometric data over a sampling window (e.g., ten minutes) according to the sampling schedule (e.g., an internal sampling schedule, the sampling schedule of the superficial tag); store the set of biometric data in a local memory unit of the subdermal sensor unit; and broadcast the set of biometric data to the superficial tag via a subdermal short-range wireless transmitter after the inductive charging cell—of the superficial tag—ceases power supply to the inductive charging coil of the subdermal sensor unit.

Additionally or alternatively, the superficial tag can transmit power to the subdermal sensor unit to prompt the subdermal sensor unit to enter an active state and begin data collection (e.g., biometric data collection). Additionally or alternatively, the superficial tag can prompt the subdermal sensor unit to collect a particular set of biometric data (e.g., heart rate). In this variation, the superficial tag can transmit the prompt to the subdermal sensor unit via an inductive charging coil via amplitude (or frequency) modulation or via a short-range wireless transmitter in the tag wireless communication module.

4. DATA ACCESS+STORAGE

Generally, the computer system can access biometric data captured by the subdermal sensor unit and transmitted to the remote computer system via an access point and/or the superficial tag.

In one example, the computer system can: access a sampling schedule; and, according to the sampling schedule, such as during a sampling window, trigger a superficial tag to transmit power to a subdermal sensor unit to thereby trigger the subdermal sensor unit to collect a set of biometric data. The subdermal sensor unit can then: collect the set of biometric data over a sampling window (e.g., ten minutes) according to the sampling schedule (e.g., an internal sampling schedule, the sampling schedule of the superficial tag); and broadcast the set of biometric data to the superficial tag via a subdermal short-range wireless transmitter after the sampling window.

In one implementation, the computer system can: access a first corpus of historical biometric data captured by a first set of sensors; and, according to a sampling schedule, trigger a second set of devices to capture a second corpus of biometric data during an initial (e.g., onboarding) period.

In one variation, the computer system can: store the corpus of biometric data and/or a vector database in a remote database; receive a set of biometric data captured during a first time period; and transmit the set of biometric data to the remote database, such as in response to detecting low and/or unreliable local memory.

Additionally or alternatively, the computer system can: store the corpus of biometric data and/or a vector database in a local database; receive a set of biometric data captured during a first time period; and store the set of biometric data to the local database, such as in response to detecting unstable wireless connection to the remote database.

Therefore, the computer system can opportunistically store and/or remotely store data according to local memory constraints and/or internet availability.

5. COW/HERD BASELINING

Generally, the computer system can: access existing historical biometric data for a population of cows (i.e. "cows") on a farm; and derive nominal characteristics of the population of cows—specific to the farm—based on these historical biometric data. For example, the computer system can: access a corpus of historical biometric data for a first cow; and compile the corpus of historical biometric data into a set of historical biometric data containers.

In particular, the computer system can: access the corpus of historical biometric data; and sort (or compile) these historical biometric data into historical biometric data containers based on temporal relationships between sets of historical biometric data in the corpus of historical biometric data.

For each historical biometric data container in the set of historical biometric data containers, the computer system can extract a label (e.g., a tag) defining a state of a cow represented by the historical biometric data container. For example, a first historical biometric data container can include a label indicating a cow, represented by the first historical biometric data container, was in estrus while a first set of historical biometric data, in the historical biometric data container, was captured from the cow.

For example, the computer system can derive historical biometric characteristics including average temperature for the first cow, average heart rate for the first cow, average heart rate variability for the first cow, average activity for the first cow, location boundaries for the first cow, etc. Additionally or alternatively, the computer system can derive historical biometric characteristics including a nominal range of temperature values for the first cow, a nominal range of heart rate values for the first cow, a nominal range of heart rate variability values for the first cow, a nominal range of activity for the first cow, etc.

In another example, the computer system can then: generate a multi-dimensional vector representing these historical biometric characteristics for the first cow; and populate a vector database with this multi-dimensional vector. In particular, the computer system can: generate a set of historical biometric vectors for each historical biometric data container in the set of historical biometric data containers; and generate a historical biometric vector database including the set of historical biometric vectors.

In one implementation, the computer system can additionally, for each historical biometric vector in the set of historical biometric vectors, access a state of the first cow. For example, the computer system can compare a first set of historical biometric characteristics (e.g., body temperature, activity level, rumination time, and milk conductivity), represented by a first historical biometric vector, to a predefined state profile to label a state (e.g., healthy, in estrus, mastitic, unhealthy) of the first cow represented in the first historical biometric vector.

In the foregoing implementation, the computer system can access the corpus of historical biometric data; and sort (or compile) these historical biometric data into historical biometric data containers based on temporal relationships between sets of historical biometric data in the corpus of historical biometric data and associations with particular cows in the population of cows. For example, the computer system can implement methods and techniques as described herein for each cow in the population of cows to thereby generate a set of nominal biometric characteristics for each cow in the population of cows.

Accordingly, in the foregoing implementations, the computer system can generate a historical biometric database representing nominal characteristics of the herd of cows, thereby enabling the computer system to, during a later time period: collect additional biometric data for cows in this herd of cows; and compare these biometric data to baseline—or known—states of these cows in order to detect deviations from healthy biometric characteristics and/or other states of interest of the cow.

6. COW-SPECIFIC INSIGHTS

Generally, the computer system can: implement methods and techniques as described above to derive a biometric database representing historical biometric data and associated states for a first cow; receive biometric data captured during a target time period for the first cow; generate a biometric data container based on these biometric data; detect proximity between the biometric data container and a cluster of historical biometric data containers in the biometric database in Block S132; and map a state, associated with the cluster of historical biometric data containers, to the first cow for the target time period.

In particular, the computer system can calculate a similarity score between the cluster of historical biometric data containers and the biometric data container. For example, the computer system can: detect proximity of a first biometric data container to a first cluster of historical biometric data containers in Block S132; and calculate a first similarity score based on the first set of biometric data represented in the first biometric data container and biometric data represented in the first cluster of historical biometric data containers in Block S140.

In one implementation, the computer system can calculate the similarity score based on biometric data represented in each historical biometric data container and biometric data represented in the first biometric data container. For example, the computer system can: extract (or otherwise access) a first set of biometric data for the first biometric data container; extract (or otherwise access) a second set of biometric data for a first cluster of historic biometric data containers; derive a set of correlations between the first set of biometric data and the second set of biometric data; and calculate the similarity score according to the set of correlations between the first set of biometric data and the second set of biometric data.

Additionally or alternatively, the computer system can calculate a distance metric between the first biometric data container and the first cluster of biometric data containers based on proximity of the first biometric data container to a first cluster of biometric data containers. For example, the computer system can: access a first corpus of biometric data associated with a first population of cows; and access a second corpus of biometric data associated with a second population of cows maintained on the first farm associated with the first cow. In this example, the computer system: assigns a first weight to the first corpus of biometric data; and assigns a second weight to the second corpus of biometric data, the second weight exceeding the first weight. Accordingly, the computer system can bias calculation of the distance metric toward farm-specific data containers. Furthermore, in this example, the computer system can: calculate a first distance value between the first biometric data container and biometric data containers in the first cluster of biometric data containers derived from the first corpus of biometric data; calculate a second distance value between the first biometric data container and biometric data containers in the first cluster of biometric data containers derived from the second corpus of biometric data; and compile (e.g., calculate a weighted average of) the first distance value, according to the first weight, and the second distance value, according to the second weight, into the first distance metric.

6.1 Variation: Artificial Intelligence Model+Updates

In one variation, the computer system can implement machine learning and/or an artificial intelligence model to detect correspondence between historical biometric data of the cow and current biometric data of the cow in order to predict a current state of the cow.

For example, the computer system can: based on the historical biometric database, generate a model configured to derive similarity between biometric data and historical biometric data; serve the first set of biometric data and biometric data represented in the first cluster of historical biometric data containers to the model; receive the first similarity score from the model; and receive a first confidence score for the similarity score from the model. In this example, the computer system can associate the first state with the first cow in response to the first confidence score for the similarity score exceeding a threshold confidence score.

In a similar variation, the computer system can train a model on the historical biometric database and correlations between biometric data and states represented in labels of historical biometric data containers. For example, the computer system can: generate a model configured to derive states based on biometric data according to correlations between biometric data and states represented in historical biometric data containers in the historical biometric database; serve the first set of biometric data, captured during a target time period, to the model; receive identification of a state associated with the first set of biometric data from the model; and associate the state with the first cow for the target time period.

In one variation, the computer system can generate a state prediction model configured to predict a state (e.g., healthy, unhealthy, in estrus, in target milk production characteristics range) of a particular cow based on biometric data captured from the particular cow.

In this variation, the computer system can: access historical biometric data associated with a population of cows (e.g., thousands of cows, a farm of cows); derive correlations between biometric data and states of cows in the population of cows—such as based on accessing labels, indicating states, associated with sets of historical biometric data; and generate the state prediction model, based on these correlations between biometric data and states of cows, to thereby generate a state prediction model configured to predict a state of a cow for a target time period based on biometric data, collected during the target time period, associated with the cow.

In particular, the computer system can: access a corpus of historical biometric data associated with a population of cows; compile the corpus of historical biometric data into a set of historical biometric data containers, such as based on temporal alignment between sets of biometric data in the corpus of biometric data and/or particular cows associated with sets of biometric data in the corpus of biometric data; and access a set of nominal biometric characteristics of a population of cows. The computer system can then, for each historical biometric data container in the set of historical biometric data containers, access a label indicating a state of a cow during collection of historical biometric data represented in the historical biometric data container. The computer system can then generate a state prediction model, configured to predict a state of a cow based on biometric data of the cow, based on sets of historical biometric data and states represented in historical biometric data container in the set of historical biometric data containers.

The computer system can then implement methods and techniques as described herein to derive a predicted state of the cow based on the state prediction model. In particular, the computer system can: access a first set of biometric data captured by a first device associated with the first cow; serve the first set of biometric data to the state prediction model; receive a predicted state of the first cow for from the state prediction model; in response to the predicted state corresponding to a target state, generate a prompt to investigate the first cow, the prompt indicating the predicted state and the first cow; and serve the prompt to an operator portal.

In the foregoing implementation, the computer system can additionally iteratively update the state prediction model based on biometric data collected from the population of cows after deployment of the state prediction model. Additionally or alternatively, the computer system can: receive identification of mislabeled and/or mis-predicted states of particular cows in the population of cows (e.g., via manual input from the operator); receive a corrected state represented by the set of biometric data; and update the state prediction model accordingly.

Therefore, in the foregoing implementation, the computer system can implement a state prediction model to enable active, adaptive decision-making, thereby improving precision of state detection, reducing consumption of limited resources by accurately directing deployment of these resources when necessary. Additionally, by creating a feedback loop via operator input, the computer system can thereby improve the state prediction model over time and customize the state prediction model to each farm.

6.2 Confidence Scores+Data Requests

Generally, the computer system can: calculate a confidence score for a similarity score; and, in response to the confidence score falling below a threshold confidence score, request additional biometric data for the first cow to recalculate the similarity score.

In particular, the computer system can: calculate a first confidence score for the first similarity score; and, in response to the first confidence score falling below a threshold confidence score, transmit a request for biometric data to a superficial tag, associated with the first cow, at a sampling rate proportional to the first confidence score. For example, the computer system can increase a sampling frequency proportional to the first confidence score. Additionally or alternatively, the computer system can increase a sampling duration inversely proportional to the first confidence score.

In this example, the computer system can then: access a second set of biometric data captured by the first device associated with the first cow responsive to the request for biometric data; calculate a second similarity score between the second set of biometric data and biometric data represented in the first cluster of historical biometric data containers; and calculate a second confidence score for the second similarity score. In this example, the computer system can generate a prompt to investigate the first cow in response to the second confidence score exceeding the threshold confidence score.

In particular, the computer system can directly compare biometric data to historical biometric data in the first cluster of historical biometric data containers to thereby decrease computational load of recalculating a similarity score responsive to calculating a confidence score falling below a threshold confidence score.

In one example, the computer system can calculate the confidence score proportional to a resolution of the biometric data associated with the first biometric data container. Additionally or alternatively, the computer system can calculate the confidence score proportional to proximity between the first biometric data container and historical biometric data containers in the cluster of historical biometric data containers.

6.2.1 Sampling Schedules+Requesting Data

Additionally or alternatively, the computer system can request additional biometric data for the first cow to recalculate the similarity score according to a sampling schedule.

For example, the computer system can, during: calculate a first confidence score for the first similarity score; in response to the first confidence score falling below a threshold confidence score, access a sampling schedule associated with the first cow in Block S170; and detect a sampling window, in the sampling schedule, succeeding the second time period (e.g., immediately succeeding the second time period, a next sampling window in the sampling schedule) in Block S172.

The computer system can then, during a third time period succeeding the sampling window: access a second set of biometric data captured by the first device associated with the first cow during the sampling window; calculate a second similarity score between the second set of biometric data and biometric data represented in the second cluster of historical biometric data containers; and calculate a composite similarity score based on the first similarity score according to a first weight and the second similarity score according to a second weight exceeding the first weight in Block S146.

In particular, the computer system can weight the second similarity score at a greater weight based on recency of collection of the second set of biometric data, and/or based on an increased likelihood of similarity between the second set of biometric data and the biometric data represented in the cluster of historical biometric data containers.

In this example, the computer system can then: in response to the composite similarity score exceeding the threshold similarity score, calculate a second confidence score for the composite similarity score; and generate the prompt to investigate the first cow in response to the second confidence score exceeding the threshold confidence score.

6.2.2 Risk Scoring+Opportunistic Data Request

In a similar implementation, the computer system can request additional biometric data for the first cow to recalculate the similarity score according to a sampling schedule and a risk of the (predicted) state of the first cow.

In this implementation, the computer system can: access the first set of biometric data captured by the first device during a first time period; access a sampling schedule for the first cow; detect a target sampling time period succeeding the first time period; and transmit the request for biometric data to the superficial tag during the target sampling time period.

In particular, the computer system can: calculate a first risk score for the cow based on the first state, such as proportional to a severity of the first state and/or a risk that the first state poses to the first cow and/or other cows in Block S174; in response to the risk score exceeding a threshold risk score, define a threshold time window for collecting a second set of biometric data in Block S175; and, in response to the sampling window occurring after the threshold time window, transmit a request for biometric data to a superficial tag associated with the first cow in Block S144. For example, the computer system can define a threshold time window based on the risk score. In particular, the computer system can: define the threshold time window temporally proximal a current time in response to the risk score exceeding a second threshold risk score exceeding the first threshold risk score; and define the threshold time window temporally offset from a current time in response to the risk score falling below the second threshold risk score exceeding the first threshold risk score.

Additionally or alternatively, in response to the risk score exceeding the second threshold risk score, the computer system can transmit a request to stream biometric data from the subdermal sensor unit to the superficial tag and to the computer system.

Then, the computer system can implement methods and techniques as described herein to: access the second set of biometric data captured by the first device associated with the first cow in response to the request for biometric data; calculate a second similarity score between the second set of biometric data and biometric data represented in the first cluster of historical biometric data containers; calculate a second confidence score for the second similarity score; and generate the prompt to investigate the first cow in response to the second confidence score exceeding the threshold confidence score.

Accordingly, the computer system can opportunistically request additional data from a subdermal sensor unit, via a superficial tag wirelessly connected to the subdermal sensor unit, proportional to a risk of the predicted state of the cow.

6.2.3 Similarity Score Threshold+Range

Additionally or alternatively, the computer system can request additional biometric data for the first cow to recalculate the similarity score in response to the similarity score approximating the similarity score threshold.

For example, in response to detecting a second cluster of historical biometric data containers proximal the second biometric data container, the computer system can calculate a similarity score between the set of biometric data represented in the biometric data container and biometric data represented in the second cluster of historical biometric data containers. The computer system can then: in response to the first similarity score approaching the threshold similarity score, transmit a request for biometric data to a superficial tag of the first cow; access a second set of biometric data captured by the first device of the first cow in response to the request for biometric data; and calculate a second similarity score between the second set of biometric data and biometric data represented in the cluster of historical biometric data containers. In response to the third similarity score exceeding the threshold similarity score, the computer system can: access a second state associated with the second cluster of historical biometric data containers; and associate the second state with the first cow for the third time period.

Accordingly, in the foregoing example, the computer system can: detect the similarity score falling within a particular range of the similarity score threshold; and automatically request additional biometric data to calculate a second similarity score and increase confidence in the second similarity score.

Therefore, the computer system can opportunistically access and/or request additional data to more accurately—and with higher confidence—predict states of the cow based on biometric data captured from the cow.

6.3 Example: Disease Detection+Outbreak Prevention

In one implementation, the computer system can implement methods and techniques as described herein to detect an unhealthy cow—such as a cow experiencing a particular disease.

In this implementation, the computer system can: access labels for historical biometric data containers in the biometric data containers database indicating particular disease indications, the biometric data in the historical biometric data containers in these clusters representing symptoms of the particular disease indications; and, in response to detecting proximity between a first biometric data container and a first cluster of historical biometric data containers in the biometric database, associate the first cow with a first disease indication associated with the first cluster of historical biometric data containers.

Additionally, in response to predicting a particular cow as unhealthy the computer system can: detect additional cows, in a population of cows, that were within a threshold proximity of the unhealthy cow; and recommend quarantine and/or administration of an antibiotic for these additional cows.

Additionally or alternatively, the computer system can: detect a group of cows, in a population of cows, that came into contact with the unhealthy cow; implement methods and techniques as described herein to derive similarity between biometric data containers for the group of cows and the cluster of historical biometric data containers; and, in response to detecting similarity, recommend quarantine and/or administration of an antibiotic for these additional cows.

For example, the computer system can: access a first state associated with the first cluster of historical biometric data containers including a disease indication; and detect a set of cows located proximal the first cow during in Block S190. For each cow in the set of cows, the computer system can then: access a set of biometric data captured by a device associated with the cow; generate a biometric data container based on the set of biometric data; based on proximity of the first biometric data container to a first cluster of historical biometric data containers, calculate a first similarity score between the first biometric data container and the first cluster of historical biometric data containers; in response to the similarity score exceeding a second threshold similarity score, the second threshold similarity score falling below the first threshold similarity score, associating the first state, including the disease indication, with the cow for the second time period; and generate the prompt indicating the first cow, the set of cows, and recommending quarantine for the first cow and the set of cows based on the disease indication.

Therefore, in the foregoing implementation, the computer system can implement a lower threshold similarity score for the group of cows based on predicting interaction between the unhealthy cow and the group of cows, thereby indicating a higher likelihood of transmission of the disease from the unhealthy cow to the group of cows. Accordingly, the computer system can enable more rapid detection and/or earlier detection of disease in a herd of cows (e.g., cattle) to thereby enable an operator (e.g., a cattle rancher) to rapidly deploy appropriate resources to the herd of cows, thereby reducing likelihood of yield loss due to disease-related culling.

6.3.1 Contact Tracing

In one implementation, the computer system can predict disease for additional cows, in a herd of cows (e.g., a herd of cows maintained on a particular farm), based on proximity between these cows and a first cow identified as an unhealthy cow.

In one example, the computer system can detect a transmissibility (e.g., degree of transmission of the disease based on proximity, "contagiousness") of a disease associated with the disease indication associated with a first cow in Block S177. The computer system can then, in response to the transmissibility of the disease exceeding a threshold transmissibility: detect a set of cows located proximal the first cow, such as based on geolocation data for a herd of cows; and predict the disease indicator for the set of cows based on proximity between the first cow and the set of cows in Block S178. The computer system can then: generate a prompt to quarantine the first cow and the set of cows and proceed with a first medication administration event for the first cow and the first set of cows during the second time period.

In another example, the computer system can predict disease for a group of cows, in the herd of cows, associated with the first cow based on group membership determined by proximity between the group of cows and the first cow (e.g., "contact tracing"). In particular, the computer system can, for each cow in the herd of cows: derive a set of geolocation patterns for the cow based on the set of biometric data in Block S192; and detect a geolocation boundary based on the set of geolocation patterns for the cow in Block S194.

The computer system can then generate groups of cows in the herd of cows based on correspondence between geolocation boundaries. In particular, the computer system can: detect correspondence between a first geolocation boundary, associated with the first cow, and a second geolocation boundary, associated with a second cow in Block S196; and define a group of cows, including the first cow and the second cow, based on correspondence between the first geolocation boundary and the second geolocation boundary in Block S198.

In response to detecting a first cow, in the group of cows, as unhealthy, the computer system can associate the first state (e.g., disease indication, "unhealthy") with the group of cows.

In the foregoing implementation, the computer system can additionally or alternatively verify association of the first state with the group of cows based on biometric data of the group of cows approximating biometric data represented in the first cluster of historic biometric data containers.

For example, the computer system can, in response to the first biometric data container approximating a first cluster of historical biometric data containers and for each cow in the group of cows: access a set of biometric data captured by a device associated with the cow; and generate a biometric data container, in a set of biometric data containers, based on the set of biometric data. The computer system can then associate the first state with the group of cows for the second time period in response to detecting proximity between the set of biometric data containers and the first cluster of historical biometric data containers.

In a similar example, the computer system can: detect a first deviation from baseline in the group of cows in a particular biometric data modality (e.g., temperature, heart rate variability); and, based on detecting disease in a first cow in the group of cows according to a set of biometric data, predict disease for each cow in the group of cows.

Additionally or alternatively, in response to detecting disease in a first cow in the group of cows, the computer system can increase a sampling rate for cows in the group of cows to thereby rapidly detect if cows in the group of cows begin to exhibit biometric symptoms of the disease. In particular, the computer system can execute a targeted variation of methods and techniques described herein to thereby reduce computational resources for disease detection in the group of cows and/or detect instances of disease in this group of cows based on predicting a higher likelihood of this disease being exhibited in cows in this group of cows. For example, the computer system can prompt increase or decrease in sampling frequency for a particular cow and/or a group of cows proportional to a severity of a condition (or state) of the cow.

Therefore, in the foregoing examples, the computer system can reduce computational load of detecting a first state (e.g., a disease indication) for the group of cows by decreasing a similarity threshold and thereby decreasing calculations needed for prediction of disease for the group of cows. Because cows in the group of cows may exhibit some symptoms, but not comprehensive symptoms, and the group of cows interacted with the first cow associated with the first state, the computer system can implement a lower threshold due to a higher likelihood of the first cow transmitting the disease to cows in the group of cows.

6.4 Example: Estrus

In one implementation, the computer system can implement methods and techniques as described herein to detect a cow in estrus and prompt an operator to respond accordingly.

In one implementation, the computer system can: extract labels of historical biometric data containers in the biometric database indicating estrus, the biometric data of the historical biometric data containers in these clusters representing indicators of estrus; and, in response to detecting proximity between a first biometric data container and a first cluster of historical biometric data containers—representing estrus—in the biometric database, predict the cow is in estrus. Additionally or alternatively, the computer system can extract, from historical biometric data containers, in the historical biometric database: a historical responsive action (e.g., scheduling an insemination event, checking for visual indicators of estrus) according to the state of estrus; and a success score (e.g., successful insemination, successful pregnancy, successful birth, unsuccessful insemination, unsuccessful pregnancy) of the historical responsive action. The computer system can then, based on proximity between the first biometric data container and a first historical biometric data container in the first cluster of historical biometric data containers: calculate a similarity score between the first set of biometric data represented in the first biometric data container and a second set of biometric data represented in the first historical biometric data container; in response to the second similarity score exceeding the threshold similarity score, access a first historical responsive action (e.g., insemination) and a first success score (e.g., successful birth) associated with the first historical biometric data container; and, in response to the first success score exceeding a threshold success score, generate the prompt including identification of the first state of the first cow, recommending the first historical responsive action, the first geolocation of the first cow, and the first set of biometric data.

In another example, the computer system can: access a first set of temperature values from the first set of biometric data; calculate an average temperature value from the first set of temperature values; access a first set of heart rate values from the first set of biometric data; calculate an average heart rate value from the first set of heart rate values; generate the first biometric data container based on the average temperature value and the average heart rate value; and detect the first biometric data container approximating the first cluster of historical biometric data containers.

In this implementation, the computer system can then calculate the first similarity score between the first set of biometric data represented in the first biometric data container and biometric data represented in the first cluster of historical biometric data containers based on: the average temperature value; the average heart rate value; a historical average temperature value associated with the first cluster of historical biometric data containers; and a historical average heart rate value associated with the first cluster of historical biometric data containers. Additionally or alternatively, the computer system can calculate the first similarity score based on: proximity of the first temperature value (e.g., a single temperature value, a series of temperature values) to a historical temperature value associated with the first cluster of historical biometric data containers; proximity of the first heart rate value (e.g., a single heart rate value, a series of heart rate values) to a historical heart rate value associated with the first cluster of historical biometric data containers; and proximity of the first set of rumination characteristics to a set of historical rumination characteristics associated with the first cluster of historical biometric data containers.

Then, the computer system can: access a state of estrus associated with the first cluster of historical biometric data containers; associate the state of estrus with the first cow for the second time period; and generate the prompt including a prompt to investigate for visual indicators of estrus (e.g., swollen vulva).

Additionally or alternatively, the computer system can: access a first set of activity values (e.g., acceleration magnitude of activity, step count, movement frequency, position changes per unit time) from the first set of biometric data; calculate an average activity value from the first set of temperature values; generate the first biometric data container based on the average activity value; and detect proximity of the first biometric data container to a first cluster of historical biometric data containers. In particular, in this implementation, the computer system can detect the first biometric data container approximating a first cluster of historical biometric data containers specific to the first cow, the first cluster of historical biometric data containers representing historical instances of the particular cow in estrus.

In this implementation, the computer system can then calculate the first similarity score between the first set of biometric data represented in the first biometric data container and biometric data represented in the first cluster of historical biometric data containers based on the average activity value and a historical average activity value associated with the first cluster of historical biometric data containers. The computer system can then: access a state of estrus associated with the first cluster of historical biometric data containers; associate the state of estrus with the first cow for the second time period; and generate the prompt including a prompt to investigate for visual indicators of estrus (e.g., swollen vulva).

In one example, the computer system can predict a second state in response to detecting misalignment between an estrus detection and an estrus cycle for a particular cow. For example, in response to predicting a particular cow is in estrus, the computer system can: access a recent history of states of the cow (e.g., over the past month); detect presence of estrus in the recent history of states of the cow; calculate a confidence score for predicting the particular cow is in estrus based on presence of estrus in the recent history of states of the cow; and, in response to the confidence score falling below a threshold confidence score, detect proximity of the first biometric data container to a second cluster of historical biometric data containers. The computer system can then repeat methods and techniques as described herein to: calculate a similarity score between the second cluster of historical biometric data containers and the first biometric data container; and, in response to the similarity score exceeding a threshold similarity score, predict the second state for the cow.

In particular, the computer system can: access a set of states of the cow for a target time period preceding the second time period in Block S154; calculate a first confidence score for the first similarity score based on the set of states of the cow for the target time period in Block S142; in response to the first confidence score falling below a threshold confidence score, detect proximity of the first biometric data container to a second cluster of historical biometric data containers in Block S132; and calculate a second similarity score between the first set of biometric data represented in the first biometric data container and biometric data represented in the second cluster of historical biometric data containers in Block S140. In response to the second similarity score exceeding the threshold similarity score, the computer system can: calculate a second confidence score for the second similarity score based on the set of states of the cow for the target time period; in response to the second confidence score exceeding the threshold confidence score, access a second state (e.g., a disease indication) associated with the second cluster of historical biometric data containers; associate the second state with the first cow for the second time period; and generate the prompt indicating the second state (e.g., unhealthy, disease indication) for the first cow and recommending quarantine of the first cow.

Then, after detecting a cow is in estrus, the computer system can schedule—or predict a target time period for—insemination of the cow.

For example, the computer system can predict an estrus window for a cow based on biometric data of the cow in Block S176 and, in particular, historical biometric data of the cow while the cow is in estrus (or "heat"). Additionally or alternatively, the computer system can predict an estrus window for a cow based on attributes associated with the cow, such as age, breed, location, etc. The computer system can then: generate a prompt to schedule an insemination event for the first cow during the estrus window; and transmit the prompt to the operator portal. Additionally or alternatively, the computer system can automatically schedule the insemination event for the first cow during the estrus window.

In a similar example, the computer system can: combine estrus day counts represented by the first cluster of historical biometric data containers to derive an estrus window associated with cows in the population of cows; and generate the prompt to schedule an insemination event for the first cow during the estrus window. Additionally or alternatively, the computer system can: access a set of records of insemination events of cows represented in the first cluster of historical biometric data containers; access insemination results of historical insemination events represented in the set of records of insemination events; identify the first cow as available for successful insemination in response to detecting successful historical insemination results in the set of records of insemination events; and generate the prompt to schedule the insemination event for the first cow in response to identifying the first cow as available for successful insemination.

More specifically, the computer system: detects an estrus onset time based on multi-modal biometric analysis (e.g., activity increase, rumination characteristics, heart rate increase) of biometric data captured from a cow; and calculates elapsed time (e.g., in hours) to classify the cow into an insemination window (e.g., a veterinary-determined insemination window). In particular, the computer system can: characterize a cow in a first (e.g., "early") insemination window within zero to eight hours after estrus onset, characterize the cow in a second (e.g., "target,") insemination window within eight to sixteen hours after estrus onset; and/or characterize the cow in a third (e.g., "late") insemination window within sixteen to twenty-four hours after estrus onset. Additionally or alternatively, for sexed sperm insemination, the computer system can: characterize a cow in a first (e.g., "early") insemination window within zero to twelve hours after estrus onset, characterize the cow in a second (e.g., "target,") insemination window within twelve to twenty-two hours after estrus onset; and/or characterize the cow in a third (e.g., "late") insemination window within twenty-two to twenty-eight hours after estrus onset.

In this example, the computer system can repeat methods and techniques as described herein for each cow in a herd of cows on a farm. The computer system can then: compile estrus windows of cows in the herd of cows into an estrus database; detect overlap between estrus windows for a set of cows in the herd of cows; in response to a count of cows in the set of cows exceeding a threshold count, schedule insemination of the set of cows during overlap between estrus windows for the set of cows.

Additionally or alternatively, the computer system can predict an estrus cycle—defining an estrus time window—specific to the first cow. For example, the computer system can: access a first subset of historical biometric data containers representing historical estrus states of the first cow; derive an estrus interval for the first cow based on the first subset of historical biometric data containers, the estrus interval representing an estrus cycle of the first cow; and generate the prompt to investigate the first cow in response to the second time period falling within an estrus window, according to the estrus interval, for the first cow.

Therefore, in the foregoing example, the computer system can selectively schedule insemination events for cows in the herd of cows to minimize a count of veterinary visits to the farm without sacrificing loss in insemination attempts for cows in the herd of cows. Additionally, in the foregoing implementations, the computer system can decrease a likelihood of false-positive identification of estrus based on the estrus cycle of cows, to thereby decrease a likelihood of deploying unnecessary resources to address estrus of this cow and increasing a likelihood of disease detection for the cow.

7. VARIATION: AMBIENT DATA

Generally, the computer system can access ambient data collected by environmental sensors deployed within a farm associated with (e.g., housing) a set of cows.

In one implementation, during the initial time period, the computer system can: access a set of external temperature values for the farm; access a set of humidity data for the farm; and compile the set of external temperature values and the set of humidity data into a farm profile representing average temperature and humidity values for the farm. Additionally or alternatively, the computer system can: access a set of optical data captured by a set of cameras installed throughout the farm; derive locations of cows throughout the farm; and derive boundaries for the cows based on these locations. Additionally or alternatively, the computer system can derive a density of cows—such as based on a count of cows—according to the set of optical data.

In one example, the computer system can: access a first set of ambient data captured by environmental sensors during the initial time period in Block S180; and generate a first set of ambient characteristics based on the first set of ambient data in Block S181. For each historical biometric data container in the set of historical biometric data containers, the computer system can then generate the historical biometric data container, in the set of historical biometric data containers based on the set of biometric data, the set of nominal biometric data, and the set of ambient characteristics. Additionally, the computer system can: access a second set of ambient data captured by environmental sensors during the second time period; generate a second set of ambient characteristics based on the second set of ambient data; and generate the first biometric data container based on the first set of biometric characteristics and the first set of ambient characteristics.

In another implementation, the computer system can: access a set of feeding data, captured by a set of feeding sensors; and derive an average feeding schedule according to the set of feeding data. Additionally or alternatively, the computer system can derive and/or access a volume of feed and/or a type of feed being distributed to the herd of cows.

7.1 Variation: Milk Production Characteristics+Prediction

Generally, the computer system can predict milk production characteristics for a target time period for a cow (and/or a population of cows) based on correlations between milk production characteristics and biometric data.

In particular, the computer system can: access a corpus of milk production data captured from a set of milk production sensors—such as sensors associated with a milking robotic unit in Block S182; for each cow in a population of cows, detect a set of milk production data associated with the cow (e.g., based on cow identifiers associated with the set of milk production data); derive a set of milk production characteristics (e.g., milk fat percentage, milk yield, somatic cell count) from sets of milk production data in the corpus of milk production data in Block S183; access a corpus of historical biometric data for the population of cows; for each cow in the population of cows, detect a set of biometric data associated with the cow (e.g., based on cow identifiers associated with the set of biometric data); temporally align sets of biometric data with sets of milk production data; and derive a set of correlations between biometric data and milk production characteristics based on temporal alignment between sets of biometric data with sets of milk production data in Block S184.

In particular, the computer system can derive correlations between milk production characteristics and biometric data. For example, the computer system can: access a corpus of milk production characteristics for the population of cows; generate a set of correlations between biometric data, in the corpus of biometric data, and milk production characteristics in the corpus of milk production characteristics (e.g., based on temporal alignment); and derive the set of nominal biometric characteristics including the set of correlations. For the first cow in the population of cows, the computer system can then: access a second set of biometric data captured by the first device associated with the first cow, the second set of biometric data captured during a third time period; calculate a first similarity score between the second set of biometric data and a first subset of correlations, in the set of correlations, corresponding to a first set of milk production characteristics; and, in response to the first similarity score exceeding a threshold similarity score, predict the first set of milk production characteristics for the first cow for the third time period.

In one example, during the initial time period, the computer system can: access a first set of historic milk production data for the first cow; derive a first set of milk production characteristics from the first set of historic milk production data; derive a set of correlations between the first set of milk production characteristics and biometric characteristics in the corpus of historical biometric data; generate a second historical biometric data container based on the set of correlations between the first set of milk production characteristics and biometric data in the corpus of historical biometric data in Block S185; and store the second historical biometric data container in the historical biometric database in Block S115.

In this example, during a third time period succeeding the second time period, the computer system can: access a second set of biometric data captured by the first device associated with the first cow, the second set of biometric data captured during the third time period; and generate a second biometric data container representing the second set of biometric data. Based on proximity of the first biometric data container to a first cluster of historical biometric data containers, the computer system can: calculate a second similarity score between the second set of biometric data represented in the second biometric data container and biometric data represented in the second historical biometric data container; and, in response to the similarity score exceeding a threshold similarity score, predict the first set of milk production characteristics for the first cow for the third time period.

Additionally or alternatively, the computer system can: access target milk production characteristics for a particular time period; predict milk production characteristics for a particular cow for the particular time period; and, in response to detecting deviation from target milk production characteristics, prompt an operator to adjust external parameters (e.g., location, feed, temperature controls) for the cow to drive these predicted milk production characteristics toward the target milk production characteristics.

In particular, the computer system can: access a set of target milk production characteristics for the first cow in Block S186; calculate a second similarity score between the set of milk production characteristics and the set of target milk production characteristics in Block S140; in response to the second similarity score falling below a threshold similarity score, detect a milk production characteristic, in the set of target milk production characteristics, deviating from the set of target milk production characteristics in Block S187; detect a subset of biometric data corresponding to the first milk production characteristic based on the set of correlations; detect a second subset of biometric data corresponding to a first target milk production characteristic, in the set of target milk production characteristics, based on the set of correlations in Block S188; derive a recommendation for the first cow based on the subset of biometric data and the second subset of biometric data in Block S160; and transmit the recommendation to the operator portal in Block S162.

In a similar implementation, the computer system can: isolate a second cluster of historical biometric data containers associated with a target milk production; derive a correlation between a first biometric data domain (e.g., temperature, feed characteristics, location, estrus state, health state) and milk production based on historical biometric data represented in the first cluster of historical biometric data containers and the second cluster of historical biometric data containers; and, in response to the correlation exceeding a threshold correlation, predict the target milk production for the first cow based on shifting a first biometric data value, of the first biometric data domain and associated with the first cluster of historical biometric data containers, toward a second biometric data value of the first biometric data domain and associated with the second cluster of historical biometric data containers. In this implementation, the computer system can: access a subset of historical biometric data containers, in the set of historical biometric data containers, associated with the first cow exhibiting the second biometric data value of the first biometric data domain; extract a set of ambient conditions, associated with the subset of historical biometric data containers, the set of ambient conditions corresponding to ambient farm conditions present while the first cow exhibits the second biometric data value of the first biometric data domain; and generate the prompt to implement the set of ambient conditions for the first cow.

In another implementation, the computer system can implement methods and techniques as described herein to correlate feed with milk production characteristics.

Accordingly, by deriving correlations between biometric data and milk output, the computer system can: predict milk output characteristics for target time periods, such as when prompted by a farm operator; detect instances of deviation from target biometric data for a target milk output (e.g., target yield, target milk fat percentage). Therefore, the computer system can prompt the farm operator to take specific actions correlated with these deviations from target biometric data to thereby drive milk output toward target milk output characteristics, thereby increasing total yield for the farm due to this target milk output.

8. OPERATOR PORTAL

Generally, the computer system can generate and transmit prompts indicating cow- and herd-specific insights for a herd of cows maintained on a particular farm to enable farm operators (e.g., cattle ranchers, farm technicians, veterinarians) to selectively deploy farm resources to cows in the herd of cows responsive to states of these cows.

In one implementation, the computer system can include an operator interface (e.g., chat interface) configured to: receive a natural language query from an operator; extract a set of language signals from the natural language query; access a database (e.g., biometric database, vector database) including historical and/or current states of cows in the herd of cows; and return a natural language prompt to the operator interface, the natural language prompt responsive to the natural language query.

For example, the computer system can receive a natural language query (e.g., "How many sick cows do I have," "How many cows are in the conventional state of estrus," "How many cows crossed Boundary A today") from the operator. The computer system can then: extract a set of language signals from the natural language query; access a farm-specific database; identify biometric and/or other characteristics responsive to the natural language query based on the set of language signals; generate a natural language prompt including the biometric and/or other characteristics (e.g., cow identifiers, biometric evidence, cow location(s), cow profiles, cow demographics, health statuses) responsive to the natural language query; and render the natural language prompt on the operator interface.

In this implementation, the computer system can store and maintain conversations via a local and/or remote memory store to thereby refer to contextual language signals to generate a particular natural language prompt responsive to additional natural language queries input by the operator. Additionally or alternatively, the computer system can generate natural language prompts including: instructions for responsive actions to deploy responsive to states of cows in the herd of cows (e.g., "schedule insemination of Cow 2124," "call the veterinarian to administer antibiotics to Cow 2335," "update a feeding schedule for cows in Group A"); instructions for navigation of the operator portal and/or operator interface; instructions for general cattle ranching and/or farming; and/or any other natural language prompt input by the operator to the operator interface.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

during an initial time period:

accessing a corpus of historical biometric data associated with a population of cows; and compiling the corpus of historical biometric data into a set of historical biometric data containers, each historical biometric data container labeled with a state of a cow during collection of historical biometric data represented in the historical biometric data container;

during a second time period succeeding the initial time period:

at a subdermal sensor unit associated with a first cow:

capturing a first set of biometric data via a set of biometric sensors arranged within the subdermal sensor unit; and transmitting the first set of biometric data, captured by the set of biometric sensors, to a superficial tag, arranged proximal the subdermal sensor unit, via a wireless charging coil arranged within the subdermal sensor unit;

at the superficial tag, transmitting the first set of biometric data to an access point accessible by a remote computer system;

representing the first set of biometric data in a first biometric data container;

based on proximity of the first biometric data container to a first cluster of historical biometric data containers, calculating a first similarity score between the first biometric data container and the first cluster of historical biometric data containers;

in response to the first similarity score exceeding a threshold similarity score, mapping a first state, associated with historical biometric data containers in the first cluster of historical biometric data containers, to the first cow;

generating a prompt to investigate the first cow, the prompt indicating the first state and the first cow; and serving the prompt to an operator portal.

2. The method of claim 1:

wherein capturing the first set of biometric data comprises capturing a first temperature value, a first heart rate value, and a first set of activity data via the set of sensors;

wherein calculating the first similarity score comprises calculating the first similarity score based on:

proximity of the first temperature value to a historical temperature value associated with the first cluster of historical biometric data containers;

proximity of the first heart rate value to a historical heart rate value associated with the first cluster of historical biometric data containers; and proximity of the first set of activity data to a set of historical activity data associated with the first cluster of historical biometric data containers;

wherein mapping the first state to the first cow comprises mapping a state of estrus to the first cow;

further comprising combining estrus day counts represented by the first cluster of historical biometric data containers to derive an estrus window associated with cows in the population of cows; and wherein generating the prompt to investigate the first cow comprises generating the prompt to schedule an insemination event for the first cow during the estrus window.

3. The method of claim 2:

further comprising:

accessing a set of records of insemination events of cows represented in the first cluster of historical biometric data containers; and accessing insemination results of historical insemination events represented in the set of records of insemination events;

wherein mapping the first state to the first cow comprises identifying the first cow as available for successful insemination in response to detecting successful historical insemination results in the set of records of insemination events; and wherein generating the prompt to schedule the insemination event for the first cow during the estrus window comprises generating the prompt to schedule the insemination event for the first cow in response to identifying the first cow as available for successful insemination.

4. The method of claim 1:

wherein mapping the first state to the first cow comprises mapping a state of estrus, associated with the first cluster of historical biometric data containers, to the first cow;

further comprising:

accessing a first subset of historical biometric data containers representing historical estrus states of the first cow; and deriving an estrus interval for the first cow based on the first subset of historical biometric data containers, the estrus interval representing an estrus cycle of the first cow; and wherein generating the prompt to investigate the first cow comprises generating the prompt to investigate the first cow in response to the second time period falling within an estrus window, according to the estrus interval, for the first cow.

5. The method of claim 4, further comprising, in response to the second time period falling outside of the estrus window:

detecting proximity of the first biometric data container to a second cluster of historical biometric data containers labeled with a disease indication;

calculating a second similarity score between in the first biometric data container and the second cluster of historical biometric data containers;

in response to the second similarity score exceeding the threshold similarity score, mapping the disease indication to the first cow;

generating a second prompt for veterinarian intervention for the first cow; and serving the second prompt to the operator portal.

6. The method of claim 1:

wherein capturing the first set of biometric data comprises capturing a first temperature value and a first heart rate value via the set of sensors in the subdermal sensor unit;

wherein calculating the first similarity score comprises calculating the first similarity score based on:

proximity of the first temperature value to a historical temperature value associated with the first cluster of historical biometric data containers; and proximity of the first heart rate value to a historical heart rate value associated with the first cluster of historical biometric data containers;

wherein mapping the first state to the first cow comprises mapping a disease indication, associated with the first cluster of historical biometric data containers, to the first cow; and wherein generating the prompt to investigate the first cow comprises generating the prompt to quarantine the first cow based on the disease indication.

7. The method of claim 1:

further comprising:

detecting proximity of the first biometric data container to a second cluster of historical biometric data containers associated with a disease indication; and calculating a second similarity score between the first biometric data container and the second cluster of historical biometric data containers;

wherein mapping the first state to the first cow comprises mapping the first state, comprising a healthy indication, to the first cow in response to the second similarity score falling below the threshold similarity score; and further comprising, during a third time period:

accessing a second set of biometric data captured by the subdermal sensor unit;

representing the second set of biometric data in a second biometric data container;

calculating a third similarity score between the second biometric data container and the first cluster of historical biometric data containers, the third similarity score falling below the first similarity score;

calculating a fourth similarity score between the second biometric data container and the second cluster of historical biometric data containers, the fourth similarity score exceeding the second similarity score;

in response to the fourth similarity score exceeding the threshold similarity score, detecting the first cow trending away from the health indication and toward the disease indication and mapping the disease indication to the first cow;

generating a second prompt for veterinarian intervention for the first cow; and serving the second prompt to the operator portal.

8. The method of claim 7:

further comprising:

identifying a group of cows comprising the first cow;

accessing a series of geolocations associated with cows in the group of cows, the series of geolocations captured during the third time period; and detecting proximity of cows, in the group of cows, to the first cow based on the series of geolocations; and wherein generating the second prompt comprises generating the second prompt to quarantine the group of cows within the series of geolocations.

9. The method of claim 1:

wherein accessing the corpus of historical biometric data associated with the population of cows comprises accessing a corpus of milk production data for the population of cows, the milk production data representing milk products produced by cows in the population of cows during time intervals of a target duration;

wherein compiling the corpus of historical biometric data into the set of historical biometric data containers comprises, for each historical biometric data container, in the set of historical biometric data containers, labeling the historical biometric data container with states comprising milk production data captured during collection of historical biometric data represented in the historical biometric data container;

wherein mapping the first state to the first cow comprises:

mapping the first state, representing milk production by cows represented by historical biometric data containers in the first cluster of historical biometric data containers, to the first cow; and predicting a first milk production by the first cow during a second time interval, approximating the target duration, based on the first state; and wherein generating the prompt comprises generating the prompt comprising prediction of the first milk production for the first cow for the second time period.

10. The method of claim 9:

further comprising:

isolating a second cluster of historical biometric data containers associated with a target milk production;

deriving a correlation between a first biometric data domain and milk production based on historical biometric data represented in the first cluster of historical biometric data containers and the second cluster of historical biometric data containers; and in response to the correlation exceeding a threshold correlation:

predicting the target milk production for the first cow based on shifting a first biometric data value, of the first biometric data domain and associated with the first cluster of historical biometric data containers, toward a second biometric data value of the first biometric data domain and associated with the second cluster of historical biometric data containers;

accessing a subset of historical biometric data containers, in the set of historical biometric data containers, associated with the first cow exhibiting the second biometric data value of the first biometric data domain; and extracting a set of ambient conditions, associated with the subset of historical biometric data containers, the set of ambient conditions corresponding to ambient farm conditions present while the first cow exhibits the second biometric data value of the first biometric data domain; and wherein generating the prompt to investigate the first cow comprises generating the prompt to implement the set of ambient conditions for the first cow.

11. The method of claim 1:

wherein capturing the first set of biometric data via the set of biometric sensors arranged within the subdermal sensor unit comprises, at the subdermal sensor unit:

accessing a sampling schedule, of the first cow, defining a first sampling frequency; and capturing the first set of biometric data according to the sampling schedule; and further comprising:

generating a request for geolocation data at a second sampling frequency exceeding the first sampling frequency;

transmitting the request to the superficial tag; and streaming geolocation data, received from the superficial tag at the second sampling frequency, to the operator portal.

12. The method of claim 1:

wherein compiling the corpus of historical biometric data into the set of historical biometric data containers comprises compiling the corpus of historical biometric data into the set of historical biometric data containers, each historical biometric data container labeled with a responsive action and a success score of the responsive action;

further comprising:

detecting a subset of historical biometric data containers, in the first cluster of historical biometric data containers, defining success scores exceeding a threshold success score; and extracting a first responsive action from the subset of historical biometric data containers; and wherein generating the prompt to investigate the first cow comprises generating the prompt to investigate the first cow and initiate the first responsive action.

13. The method of claim 12, wherein generating the prompt to investigate the first cow comprises:

accessing a first geolocation of the first cow; and generating the prompt comprising:

identification of the first state of the first cow;

recommending the first historical responsive action;

the first geolocation of the first cow; and the first set of biometric data.

14. The method of claim 1:

wherein transmitting the first set of biometric data at the subdermal sensor unit comprises:

at the wireless charging coil, receiving energy from a wireless charging cell of the superficial tag installed proximal the subdermal sensor unit; and transmitting the first set of biometric data via a short-range wireless communication protocol responsive to receiving power from the wireless charging cell;

further comprising, at the wireless charging coil arranged in the superficial tag:

during the second time period, transmitting energy to the wireless charging coil of the subdermal sensor unit; and receiving the first set of biometric data transmitted by the wireless charging coil in the subdermal sensor unit; and wherein transmitting the first set of biometric data to the access point at the superficial tag comprises, at a wireless communication module arranged within the superficial tag, transmitting the first set of biometric data to the access point via a long-range wireless communication protocol.

15. A method comprising:

during an initial time period:

accessing a corpus of biometric data associated with a population of cows; and compiling the corpus of biometric data into a set of biometric data containers, each biometric data container labeled with a state of a cow during collection of biometric data represented in the biometric data container; and during a second time period succeeding the initial time period:

at a subdermal sensor unit associated with a first cow:

capturing a first set of biometric data via a set of biometric sensors arranged within the subdermal sensor unit; and transmitting the first set of biometric data to a superficial tag arranged proximal the subdermal sensor unit;

at the superficial tag, transmitting the first set of biometric data to an access point accessible by a remote computer system;

representing the first set of biometric data in a first biometric data container;

based on proximity of the first biometric data container to a first cluster of biometric data containers, calculating a first distance metric between the first biometric data container and the first cluster of biometric data containers;

in response to the first distance metric falling below a threshold distance metric, mapping a first state, associated with biometric data containers in the first cluster of biometric data containers, to the first cow;

generating a prompt indicating the first state and the first cow; and serving the prompt to an operator portal.

16. The method of claim 15:

further comprising:

detecting proximity of the first biometric data container to a second cluster of biometric data containers associated with a disease indication; and calculating a second distance metric between the first biometric data container and the second cluster of biometric data containers;

wherein mapping the first state to the first cow comprises mapping the first state, comprising a healthy indication, to the first cow in response to the second distance metric exceeding the threshold distance metric; and further comprising, during a third time period:

accessing a second set of biometric data captured by the subdermal sensor unit;

representing the second set of biometric data in a second biometric data container;

calculating a third distance metric between the second biometric data container and the first cluster of historical biometric data containers, the third distance metric exceeding the first distance metric;

calculating a fourth distance metric between the second biometric data container and the second cluster of historical biometric data containers, the fourth similarity score falling below the second distance metric;

in response to the fourth distance metric falling below the threshold distance metric, detecting the first cow trending away from the health indication and toward the disease indication and mapping the disease indication to the first cow;

generating a second prompt for veterinarian intervention for the first cow; and serving the second prompt to the operator portal.

17. The method of claim 15:

wherein capturing the first set of biometric data comprises capturing a first heart rate value and a first set of activity data via the set of sensors;

wherein calculating the first distance metric comprises calculating the first distance metric based on:

proximity of the first heart rate value to a historical heart rate value associated with the first cluster of biometric data containers; and proximity of the first set of first set of activity data to a set of historical activity data associated with the first cluster of biometric data containers;

wherein mapping the first state to the first cow comprises mapping a state of estrus to the first cow;

further comprising deriving an estrus window associated with cows in the population of cows based on estrus day counts represented by the first cluster of biometric data containers; and wherein generating the prompt comprises generating the prompt to schedule an insemination event for the first cow during the estrus window.

18. The method of claim 15:

further comprising accessing a set of records of insemination events and insemination results of historical insemination events for cows represented in the first cluster of biometric data containers;

wherein mapping the first state to the first cow comprises identifying the first cow as available for successful insemination in response to detecting successful historical insemination results in the set of records of insemination events; and wherein generating the prompt to schedule the insemination event for the first cow during the estrus window comprises generating the prompt to schedule the insemination event for the first cow in response to identifying the first cow as available for successful insemination.

19. The method of claim 15:

wherein accessing the corpus of biometric data associated with the population of cows comprises:

accessing a first corpus of biometric data associated with a first population of cows; and accessing a second corpus of biometric data associated with a second population of cows maintained on a first farm;

wherein compiling the corpus of biometric data into a set of biometric data containers comprises:

assigning a first weight to the first corpus of biometric data; and assigning a second weight to the second corpus of biometric data, the second weight exceeding the first weight; and wherein calculating the first distance metric between the first biometric data container and the first cluster of biometric data containers comprises:

calculating a first distance value between the first biometric data container and biometric data containers in the first cluster of biometric data containers derived from the first corpus of biometric data;

calculating a second distance value between the first biometric data container and biometric data containers in the first cluster of biometric data containers derived from the second corpus of biometric data; and compiling the first distance value, according to the first weight, and the second distance value, according to the second weight, into the first distance metric.

20. A method comprising:

accessing a corpus of biometric data associated with a population of cows;

compiling the corpus of biometric data into a set of biometric data containers, each biometric data container labeled with a state of a cow during collection of biometric data represented in the biometric data container;

at a subdermal sensor unit associated with a first cow:

capturing a first set of biometric data via a set of biometric sensors arranged within the subdermal sensor unit; and transmitting the first set of biometric data to a superficial tag arranged proximal the subdermal sensor unit;

at the superficial tag, transmitting the first set of biometric data to an access point;

representing the first set of biometric data in a first biometric data container;

based on proximity of the first biometric data container to a first cluster of biometric data containers, calculating a first similarity score between the first biometric data container and the first cluster of biometric data containers;

in response to the first similarity score exceeding a threshold similarity score, mapping a first state, associated with biometric data containers in the first cluster of biometric data containers, to the first cow;

generating a prompt indicating the first state and the first cow; and serving the prompt to an operator portal.

* * * * *